US011021242B2

(12) United States Patent
Hayden, III

(10) Patent No.: US 11,021,242 B2
(45) Date of Patent: Jun. 1, 2021

(54) APPARATUS FOR PROVIDING RAIL-BASED VERTICAL SHORT TAKEOFF AND LANDING AND OPERATIONAL CONTROL

(71) Applicant: THE HAYDEN EFFECT, LLC, Poway, CA (US)

(72) Inventor: Raymond Don Hayden, III, Poway, CA (US)

(73) Assignee: The Hayden Effect, LLC, Poway, CA (US)

(*) Notice: Subject to any disclaimer, the term of this patent is extended or adjusted under 35 U.S.C. 154(b) by 744 days.

(21) Appl. No.: 15/654,482

(22) Filed: Jul. 19, 2017

(65) Prior Publication Data
US 2018/0044005 A1    Feb. 15, 2018

Related U.S. Application Data

(60) Provisional application No. 62/373,841, filed on Aug. 11, 2016.

(51) Int. Cl.
*B64C 27/20* (2006.01)
*B64C 29/00* (2006.01)
(Continued)

(52) U.S. Cl.
CPC .......... *B64C 27/20* (2013.01); *B64C 29/0016* (2013.01); *B64C 39/006* (2013.01);
(Continued)

(58) Field of Classification Search
CPC ..... B64C 27/20; B64C 39/062; B64C 39/006; B64C 29/0016; B64C 39/024;
(Continued)

(56) References Cited

U.S. PATENT DOCUMENTS 2,604,950 A    7/1952  Sipe
2,652,898 A    9/1953  Edouard et al.
(Continued)

FOREIGN PATENT DOCUMENTS

EP    0566891 A1    10/1993
WO    WO-0156879 A1    8/2001

OTHER PUBLICATIONS

Lin, et al., "Remove Wireless Power Transmission for Regenerative Fuel Cells," 2008, p. 1-16.

*Primary Examiner* — Assres H Woldemaryam
(74) *Attorney, Agent, or Firm* — Gazdzinski & Associates, PC

(57) ABSTRACT

Apparatus for vertical or short takeoff and landing, and operational control during flight. In one embodiment, the apparatus includes a main body assembly, the main body assembly including: a fuselage, the fuselage includes one or more power motor assemblies and one or more actuator motor assemblies; a plurality of power mounting bodies and a plurality of power/articulation mounting bodies; a static rail that is operatively coupled with the plurality of power mounting bodies; a transient rail that is operatively coupled with the plurality of power/articulation bodies; and a plurality of airfoils, each of the plurality of airfoils being coupled to a respective power/articulation mounting body. Various sub-systems of the apparatus and methods of manufacture and use are also disclosed.

10 Claims, 20 Drawing Sheets

(51) Int. Cl.
    *B64C 39/02*    (2006.01)
    *B64C 39/06*    (2006.01)
    *B64C 39/00*    (2006.01)

(52) U.S. Cl.
    CPC .......... *B64C 39/024* (2013.01); *B64C 39/062* (2013.01); *B64C 2201/027* (2013.01); *B64C 2201/108* (2013.01); *B64C 2201/162* (2013.01)

(58) Field of Classification Search
    CPC ........ B64C 2201/162; B64C 2201/027; B64C 2201/108
    See application file for complete search history.

(56) References Cited

U.S. PATENT DOCUMENTS

| | | | |
|---|---|---|---|
| 3,031,017 A | | 4/1962 | Arcidiacono |
| 3,041,012 A | * | 6/1962 | Gibbs ................... B64C 39/001 |
| | | | 244/17.23 |
| 3,470,765 A | | 10/1969 | Campbell |
| 3,489,374 A | * | 1/1970 | Morcom ................. B64C 39/06 |
| | | | 244/12.2 |
| 3,507,461 A | | 4/1970 | Rosta |
| 3,514,053 A | | 5/1970 | Mcguinness |
| 3,632,065 A | | 1/1972 | Rosta |
| 3,729,272 A | | 4/1973 | Lemont et al. |
| 3,774,865 A | | 11/1973 | Pinto |
| 3,924,965 A | | 12/1975 | Lemont |
| 3,985,320 A | | 10/1976 | Brady |
| 3,997,131 A | * | 12/1976 | Kling ..................... B64C 27/10 |
| | | | 244/23 R |
| 4,032,084 A | | 6/1977 | Black |
| 4,123,018 A | | 10/1978 | Tassin De Montaigu |
| 4,296,892 A | | 10/1981 | Barge |
| 4,301,981 A | | 11/1981 | Hartt |
| 4,307,856 A | * | 12/1981 | Walker ................... B64C 39/06 |
| | | | 244/12.2 |
| 4,461,436 A | * | 7/1984 | Messina ................. B64C 27/20 |
| | | | 244/23 C |
| 4,478,379 A | | 10/1984 | Kerr |
| 4,778,128 A | | 10/1988 | Wright et al. |
| 4,787,573 A | | 11/1988 | Pauchard |
| 5,064,143 A | * | 11/1991 | Bucher ................... B64C 27/20 |
| | | | 244/23 C |
| 5,072,892 A | | 12/1991 | Carrington |
| 5,318,248 A | | 6/1994 | Zielonka |
| 5,653,404 A | * | 8/1997 | Ploshkin .................. B63G 8/00 |
| | | | 244/12.2 |
| 5,887,828 A | | 3/1999 | Appa |
| 6,010,098 A | | 1/2000 | Campanile et al. |
| 6,270,036 B1 | * | 8/2001 | Lowe, Jr. .................. B64B 1/00 |
| | | | 244/12.2 |
| 6,293,492 B1 | | 9/2001 | Yanagisawa |
| 6,308,912 B1 | | 10/2001 | Kirjavainen |
| 6,382,560 B1 | | 5/2002 | Ow |
| 6,398,159 B1 | | 6/2002 | Di |
| 6,450,446 B1 | | 9/2002 | Holben |
| 6,575,401 B1 | | 6/2003 | Carver |
| 6,581,872 B2 | | 6/2003 | Walmsley |
| 7,410,123 B2 | | 8/2008 | Nunnally |
| 7,559,506 B2 | * | 7/2009 | Kissel, Jr. ............. B64C 39/001 |
| | | | 244/17.11 |
| 7,604,198 B2 | * | 10/2009 | Petersen ................. B64C 27/20 |
| | | | 244/17.23 |
| 7,931,239 B2 | | 4/2011 | Spirov et al. |
| 7,950,603 B2 | | 5/2011 | Kissel, Jr. |
| 7,971,823 B2 | | 7/2011 | Martin |
| 8,146,854 B2 | | 4/2012 | Lawrence |
| 8,167,234 B1 | | 5/2012 | Moore |
| 8,256,719 B2 | | 9/2012 | Wood et al. |
| 8,322,649 B2 | | 12/2012 | Martin |
| 8,418,967 B2 | | 4/2013 | Hemmelgarn et al. |
| 8,464,978 B2 | | 6/2013 | Yim et al. |
| 8,657,561 B2 | | 2/2014 | Buffone et al. |
| 8,827,644 B2 | | 9/2014 | Behrens et al. |
| 8,948,928 B2 | | 2/2015 | Alber |
| 8,979,016 B2 | | 3/2015 | Hayden, III |
| 9,511,857 B2 | | 12/2016 | Chai |
| 2003/0136875 A1 | | 7/2003 | Pauchard |
| 2005/0067527 A1 | | 3/2005 | Petersen |
| 2007/0215746 A1 | | 9/2007 | Rieken et al. |
| 2008/0112808 A1 | | 5/2008 | Schmaling et al. |
| 2009/0084891 A1 | | 4/2009 | Darrow, Jr. et al. |
| 2010/0187369 A1 | | 7/2010 | Fleming |
| 2010/0320333 A1 | | 12/2010 | Martin |
| 2011/0110773 A1 | | 5/2011 | Domercq et al. |
| 2011/0163199 A1 | | 7/2011 | Cardozo |
| 2012/0049009 A1 | | 3/2012 | Kissel, Jr. |
| 2012/0298793 A1 | | 11/2012 | Weddendorf et al. |
| 2015/0251757 A1 | | 9/2015 | Hayden, III et al. |
| 2016/0101852 A1 | * | 4/2016 | Jiang ..................... B64C 27/20 |
| | | | 244/23 A |

* cited by examiner

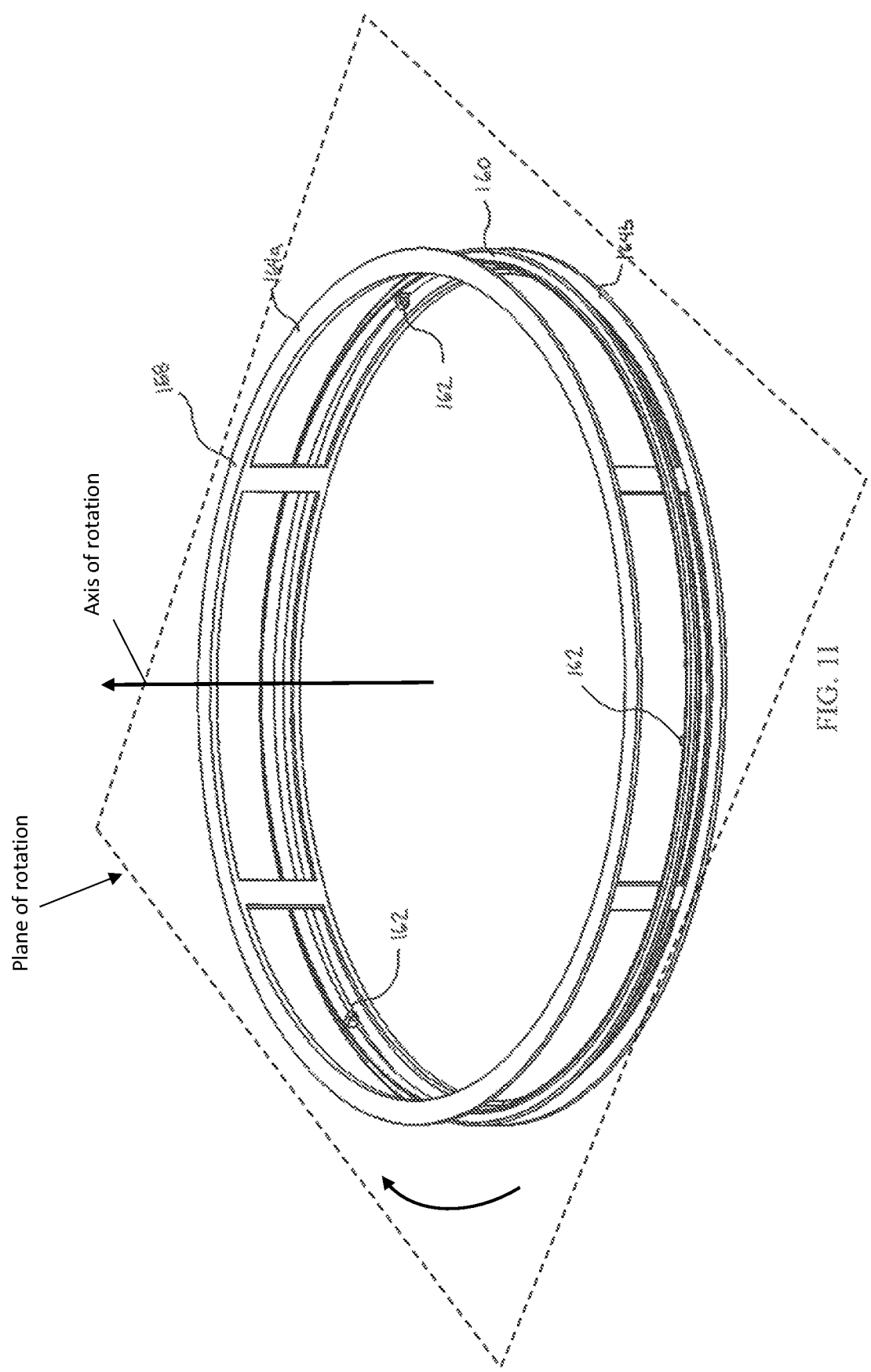

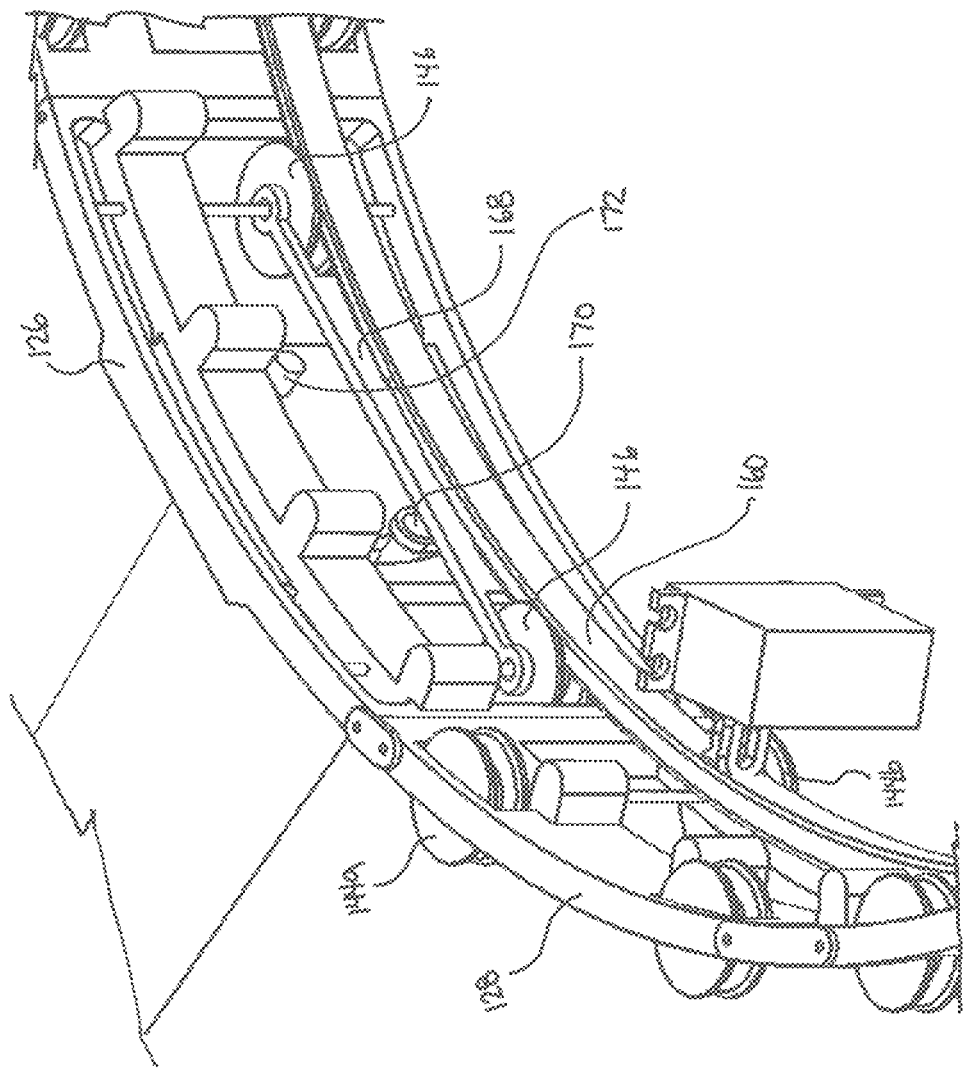

APPARATUS FOR PROVIDING RAIL-BASED VERTICAL SHORT TAKEOFF AND LANDING AND OPERATIONAL CONTROL

PRIORITY

This application claims the benefit of priority to U.S. Provisional Patent Application Ser. No. 62/373,841 filed Aug. 11, 2016 and entitled "Method and Apparatus for Vertical Take-Off and Landing", the contents of which being incorporated herein by reference in its entirety.

RELATED APPLICATION DATA

This application is related to co-owned U.S. patent application Ser. No. 15/179,859 filed Jun. 10, 2016 and entitled "Methods and Apparatus for Vertical Short Takeoff and Landing and Operational Control", which claims priority to U.S. Provisional Patent Application Ser. No. 62/174,417 filed Jun. 11, 2015 entitled "Methods and Apparatus for Vertical Short Takeoff and Landing and Operational Control", the contents of which are incorporated herein by reference in their entirety. This application is also related to co-owned U.S. patent application Ser. No. 14/659,282 filed Mar. 16, 2015 and entitled "Vertical Short Takeoff and Landing Apparatus", now U.S. Pat. No. 9,561,851, which is a continuation of and claims priority to U.S. patent application Ser. No. 13/675,707 filed Nov. 13, 2012 entitled "Methods and Apparatus for Vertical Short Takeoff and Landing", now U.S. Pat. No. 8,979,016, which claims priority to U.S. Provisional Patent Application Ser. No. 61/560,667 filed Nov. 16, 2011 entitled "Methods and Apparatus for Vertical Short Takeoff and Landing", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the fields of aviation and aerospace engineering. More particularly, in one exemplary aspect, the present disclosure is directed to methods and apparatus for vertical short takeoff and landing, and also in certain aspects to operational control of such apparatus.

2. Description of Related Technology

A wide range of aviation related applications require flexibility in aircraft movement. Common requirements are vertical or short takeoff, hovering capabilities, and frequent changes in flight vector, etc. Additionally, unmanned aircraft are in high demand for defense or other applications (such as drug surveillance or interdiction) in which deploying personnel is either too dangerous or impractical given the task requirements.

It is impossible to design aircraft that meet the needs of every aviation application. Therefore, having a wide variety of aircraft designs utilizing a wide variety of flight systems (e.g. propulsion, takeoff, landing etc.) is necessary to match the requirements of a multitude of tasks. However, given monetary constraints, there is a practical limit to the number of aircraft that can be manufactured and dedicated to any specific purpose or group. Moreover, there are significant economies of scale and other attendant benefits when a given platform (or set of closely related platforms) can be "repurposed" or reconfigured to suit different tasks, akin to the extant Lockheed Martin F-35 Lightning II paradigm. Therefore, it is important that selected designs offer the broadest task flexibility possible, while not overlapping unduly with aircraft already in widespread use.

Existing solutions for vertical short takeoff and landing (VSTOL) generally either comprise: (i) those driven by a main rotor stabilized via a tail rotor (e.g., helicopter), (ii) more traditional airplane driven by engines or turbines that can be placed in multiple orientations (e.g., V-22 Osprey or Harrier jets, or the "B" variant of the aforementioned F-35), or (iii) small craft dependent on one or more turbines (Multipurpose Security and Surveillance Mission Platform or SoloTrek Exo-Skeletor Flying Vehicle). While the more traditional plane designs offer high-top speeds, and increase mission range/duration via gliding capabilities, these systems are limited in the speed at which they can accommodate a significant change in flight vector. Thus, these vehicles would be inappropriate for e.g., low-altitude applications in an urban environment. Conversely, helicopters and smaller turbine based craft lack the capability to remain aloft without expending significant power or fuel resources to keep their turbines running. Moreover, all of these vehicles have a preferred orientation such that if they become inverted, the craft will have to be righted before lift capability can be restored.

Unfortunately, modern applications often require both flight through confined areas and long on-station dwell or long-range deployment of the aircraft. Moreover, vehicles used in such applications may often experience violent disruptions or turbulence in their immediate airspace. Thus, losing lift capability as a result of environmental conditions or an unexpected inversion is a significant operational limitation.

Accordingly, improved solutions are required for VSTOL, as well as control during operation. Such improved solutions should ideally be flexible enough for urban or other confined area navigation, be able to generate lift in multiple orientations, and have suitable on-station dwell and range operational capacity, all with low operational and maintenance cost (e.g., dollars per flight hour).

SUMMARY

The present disclosure satisfies the aforementioned needs by providing, inter alia, improved methods and apparatus for vertical short takeoff and landing, and operational control.

In a first aspect of the disclosure, a VSTOL apparatus is disclosed. In one embodiment, the VSTOL apparatus includes a main body assembly, the main body assembly including: a fuselage, the fuselage including one or more power motor assemblies and one or more actuator motor assemblies; a plurality of power mounting bodies and a plurality of power/articulation mounting bodies; a static rail that is operatively coupled with the plurality of power mounting bodies; a transient rail that is operatively coupled with the plurality of power/articulation bodies; and a plurality of airfoils, each of the plurality of airfoils being coupled to a respective power/articulation mounting body.

In one variant, the VSTOL apparatus further includes a shroud assembly, the shroud assembly being coupled with the main body assembly via the use of one or more support rods.

In another variant, the shroud assembly further includes one or more thruster motors, the shroud assembly further including an intake port and an exhaust port.

In yet another variant, the one or more thruster motors is configured to counteract a torque applied to the VSTOL apparatus via rotation of the plurality of airfoils.

In yet another variant, the static rail includes an upper ledge and a lower ledge, the upper ledge configured to be operatively coupled with upper wheels located on a power mounting body and the lower ledge configured to be operatively coupled with lower wheels located on the power mounting body.

In yet another variant, each of the upper wheels is configured to couple with the upper ledge on both a top side of the upper ledge and a bottom side of the upper ledge.

In yet another variant, each of the plurality of power/articulation mounting bodies further includes a cam arm having two wheels coupled on respective ends of the cam arm.

In yet another variant, the one or more actuator motor assemblies are coupled with the transient rail, the one or more actuator motor assemblies being configured to articulate the transient rail.

In yet another variant, the one or more actuator motor assemblies includes a plurality of actuator motor assemblies, each of the plurality of actuator motor assemblies being configured to articulate the transient rail independent from other ones of the plurality of actuator motor assemblies.

In yet another variant, one or more wheels coupled with the cam arm are further configured to be coupled with the transient rail.

In yet another variant, each of the one or more wheels is configured to couple with both a top side of the transient rail and a bottom side of the transient rail.

In yet another variant, articulation of the transient rail is configured to articulate at least one of the plurality of airfoils.

In yet another variant, the one or more power motor assemblies further includes a first power transfer portion and each of the plurality of power mounting bodies includes a second power transfer portion, the first power transfer portion configured to power the second power transfer portion to which the first power transfer portion is engaged.

In yet another variant, the one or more power motor assemblies includes a plurality of power motor assemblies, one of the plurality of power motor assemblies is configured to be powered while a second one of the plurality of power motor assemblies is configured to be unpowered.

In yet another variant, the VSTOL apparatus is further configured to alternate the powering of the one of the plurality of power motor assemblies with the second one of the plurality of power motor assemblies.

In yet another variant, a second main body assembly is disclosed, the second main body assembly including: a second fuselage, the second fuselage including one or more second power motor assemblies and one or more second actuator motor assemblies; a second plurality of power mounting bodies and a second plurality of power/articulation mounting bodies; a second static rail that is operatively coupled with the second plurality of power mounting bodies; a second transient rail that is operatively coupled with the second plurality of power/articulation bodies; and a second plurality of airfoils, each of the second plurality of airfoils being coupled to a respective second power/articulation mounting body.

In yet another variant, the plurality of airfoils are configured to contra-rotate with respect to the second plurality of airfoils.

In yet another variant, the first fuselage and the second fuselage each includes a polygon type shape.

In yet another variant, the VSTOL apparatus further includes a landing gear apparatus, the landing gear apparatus being coupled with the VSTOL apparatus.

In yet another variant, the first fuselage includes a polygon type shape.

In a second aspect of the disclosure, methods of operating the aforementioned VSTOL apparatus are disclosed.

In a third aspect of the disclosure, methods of using the aforementioned VSTOL apparatus are disclosed.

In a fourth aspect of the disclosure, an articulation system for use with the aforementioned VSTOL apparatus is disclosed. In one embodiment, the articulation system includes a plurality of power/articulation mounting bodies, each including a cam arm having two wheels coupled on respective ends of the cam arm.

In one variant, one or more actuator motor assemblies are coupled with a transient rail, the one or more actuator motor assemblies being configured to articulate the transient rail.

In another variant, the one or more actuator motor assemblies includes a plurality of actuator motor assemblies, each of the plurality of actuator motor assemblies being configured to articulate the transient rail independent from other ones of the plurality of actuator motor assemblies.

In yet another variant, the two wheels coupled on respective ends of the cam arm are further configured to be coupled with the transient rail.

In yet another variant, each of the two wheels is configured to couple with both a top side of the transient rail and a bottom side of the transient rail.

In yet another variant, articulation of the transient rail is configured to articulate at least one of the plurality of airfoils.

In a fifth aspect of the disclosure, methods of operating the aforementioned articulation system of a VSTOL apparatus are disclosed.

In a sixth aspect of the disclosure, methods of using the aforementioned articulation system of a VSTOL apparatus are disclosed.

In a seventh aspect of the disclosure, a power system for use with the aforementioned VSTOL apparatus are disclosed. In one embodiment, the power system includes one or more power motor assemblies that include a first power transfer portion and each of a plurality of power mounting bodies includes a second power transfer portion, the first power transfer portion configured to power the second power transfer portion to which the first power transfer portion is engaged.

In one variant, the one or more power motor assemblies includes a plurality of power motor assemblies, one of the plurality of power motor assemblies is configured to be powered while a second one of the plurality of power motor assemblies is configured to be unpowered.

In another variant, the VSTOL apparatus is further configured to alternate the powering of the one of the plurality of power motor assemblies with the second one of the plurality of power motor assemblies.

In an eighth aspect of the disclosure, methods of operating the aforementioned power system of a VSTOL apparatus are disclosed.

In a ninth aspect of the disclosure, methods of using the aforementioned power system of a VSTOL apparatus are disclosed.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 1I is a perspective view of the static rail and the transient rail for use in, for example, the VSTOL apparatus of FIG. 1A in accordance with the principles of the present disclosure.

FIG. 1L is a second perspective view illustrating the actuator assembly coupled with an actuator cam assembly that is in turn coupled with an airfoil for use in, for example, the VSTOL apparatus of FIG. 1A in accordance with the principles of the present disclosure.

DETAILED DESCRIPTION

Reference is now made to the drawings, wherein like numerals refer to like parts throughout.

DETAILED DESCRIPTION OF EXEMPLARY EMBODIMENTS

Exemplary embodiments are now described in detail. While these embodiments are primarily discussed in the context of an unmanned VSTOL aircraft, it will be recognized by those of ordinary skill that the present disclosure is not so limited. In fact, the various aspects are useful for VSTOL in a variety of other contexts which include manned VSTOL applications. For example, embodiments may be readily adapted for use as remote viewing and/or other sensory aids (e.g., audio, IR, ionizing, radiation, electromagnetic radiation such as wireless communications) for law enforcement, drug interdiction, search and rescue, or even for surveillance such as by private investigators. Similarly, embodiments (whether manned or unmanned) could be used for, for example, opportunistic equipment deployment (sport events, disaster areas, emergency response zones, etc.).

Furthermore, while the disclosure is discussed primarily in the context of generating lift in a gaseous fluid medium such as the earth's atmosphere, it will be recognized by those of ordinary skill that the architectures and principle disclosed herein could be readily adapted for use in other operating environments, such as liquids, with the discussion using gaseous mediums merely being exemplary.

It will also be recognized that while particular dimensions are associated with the exemplary embodiments disclosed herein for the apparatus or its components, the apparatus may advantageously be scaled to a variety of different sizes, depending on the intended application. For instance, the disclosure contemplates a small table-top or even hand-held variant which may be useful for, for example, low altitude surveillance or the like. Likewise, a larger-scale variant is contemplated, which may carry a more extensive array of sensors, personnel (e.g., in rescue operations) and even weapons (such as e.g., Hellfire precision guided munitions or the like), have greater loiter and altitude capabilities, etc. This design scalability is one salient advantage of the apparatus and methods described herein.

Exemplary VSTOL Apparatus—

Figure 1A:
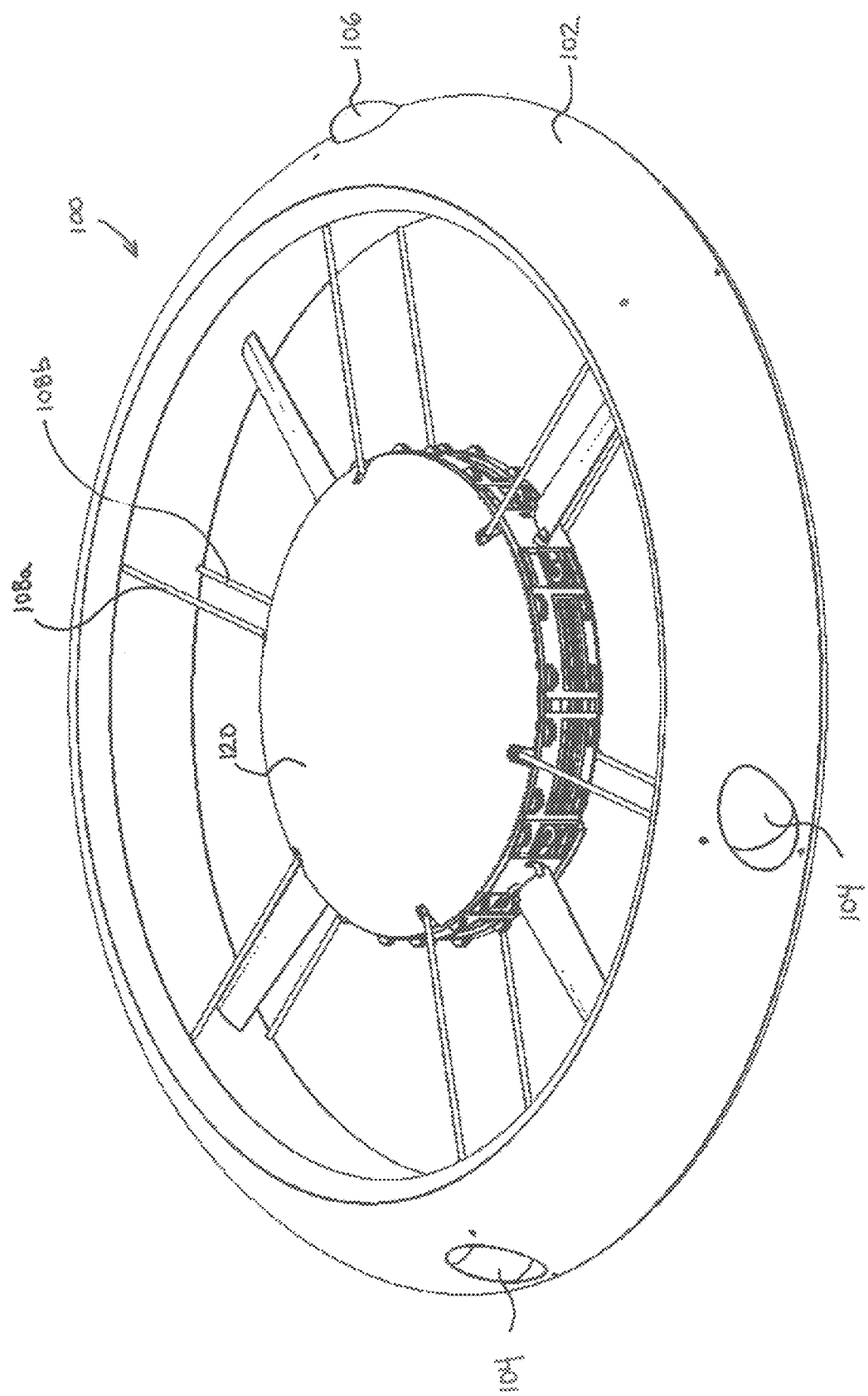
FIG. 1A is a perspective view of a first exemplary embodiment of a vertical short takeoff and landing (VSTOL) apparatus in accordance with the principles of the present disclosure.
Figure 1B:
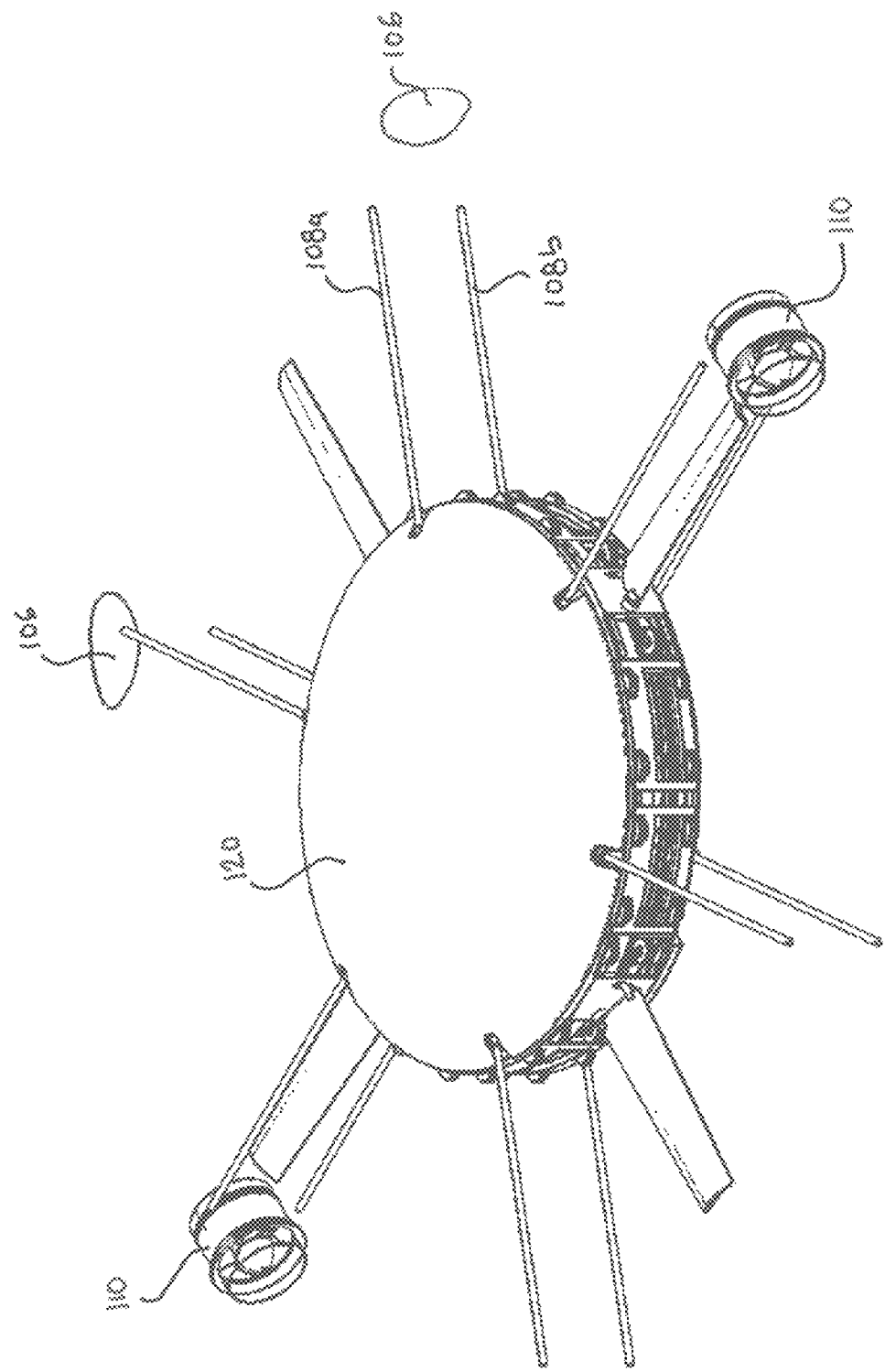
FIG. 1B is a perspective view of the VSTOL apparatus of FIG. 1A, with the shroud removed from view in accordance with the principles of the present disclosure.
Figure 1C:
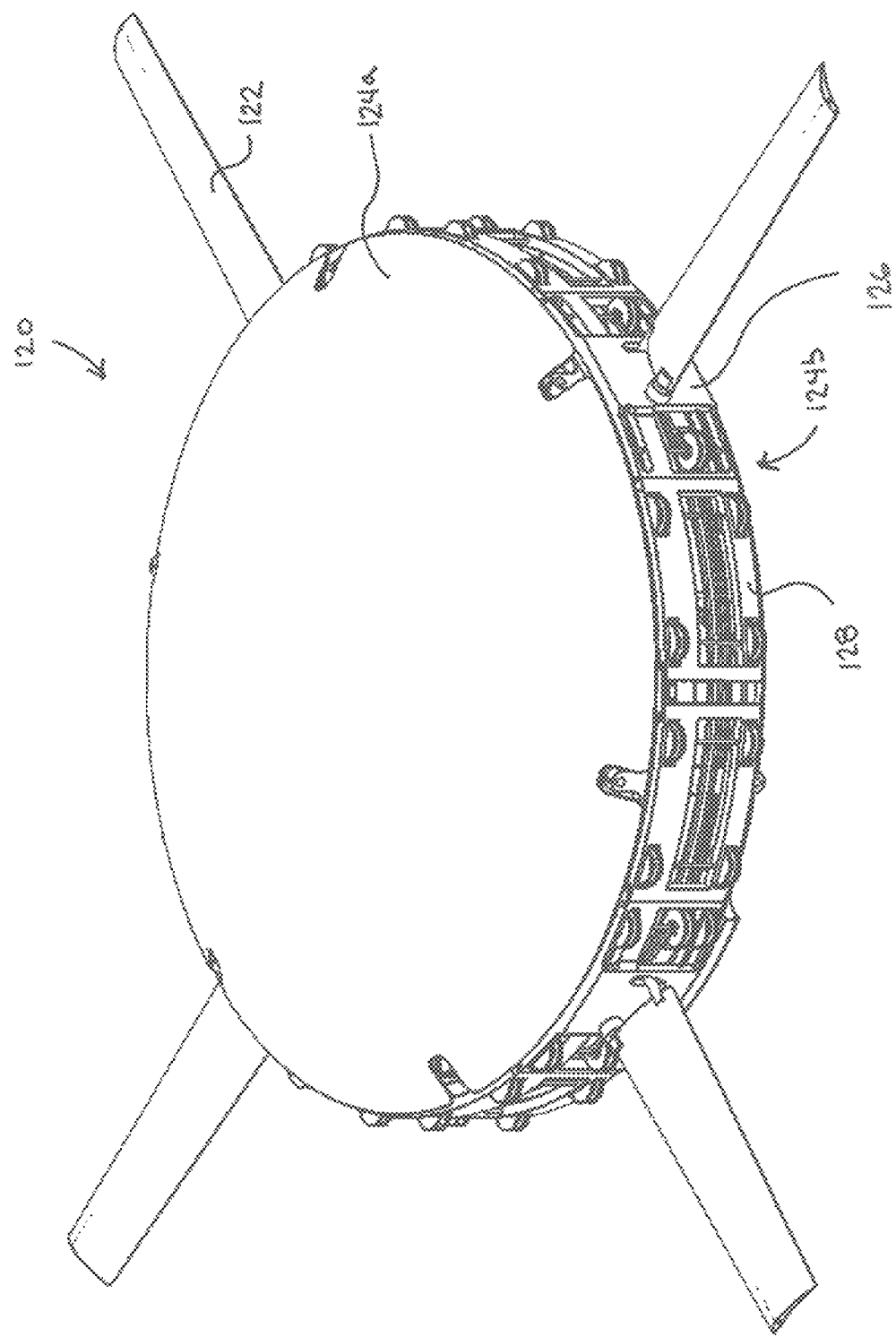
FIG. 1C is a perspective view of the VSTOL apparatus of FIG. 1A, which has the shroud assembly removed from view in accordance with the principles of the present disclosure.
Figure 1D:
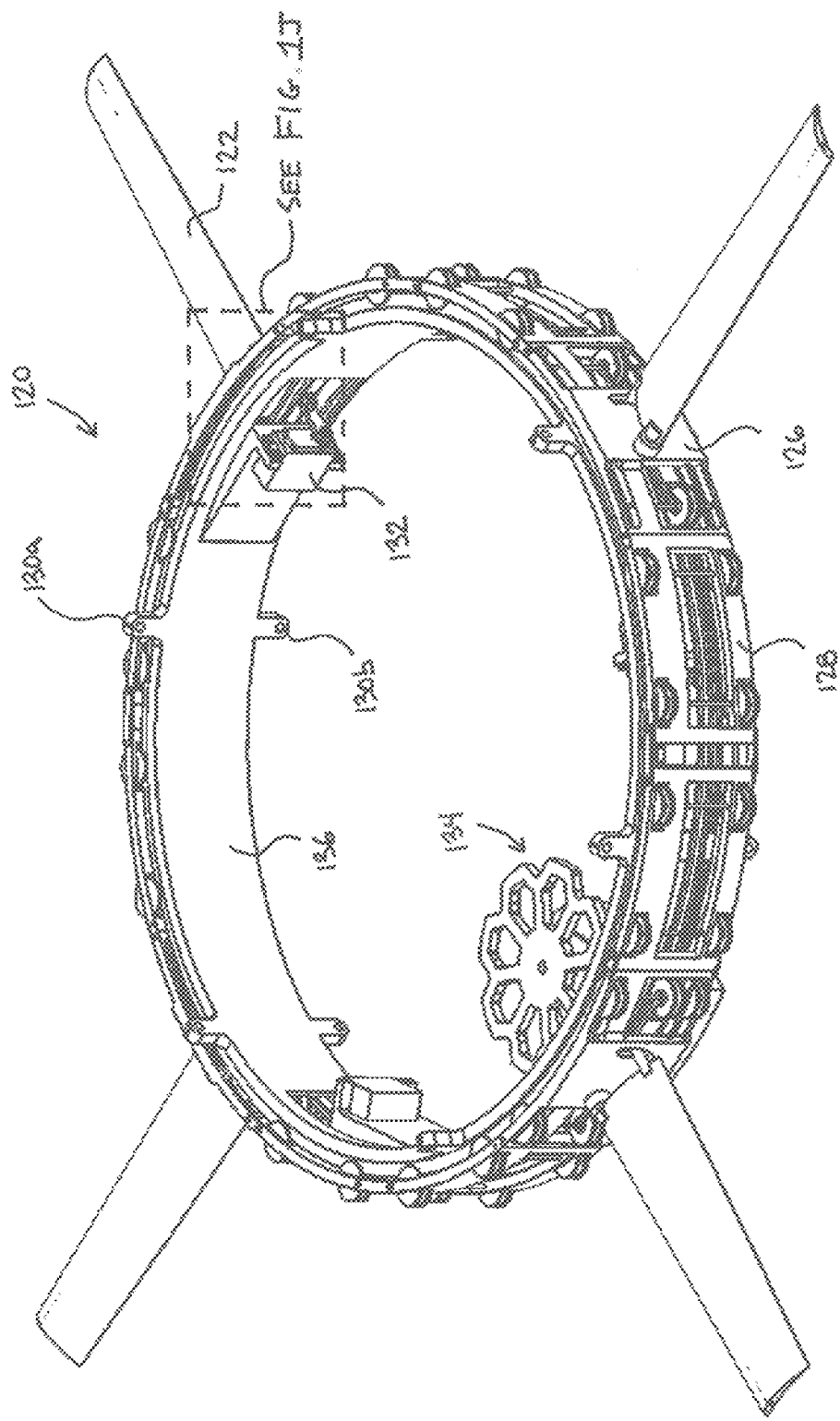
FIG. 1D is a perspective view of the VSTOL apparatus of FIG. 1C, with the top and bottom dome apparatus removed from view in accordance with the principles of the present disclosure.
Figure 1E:
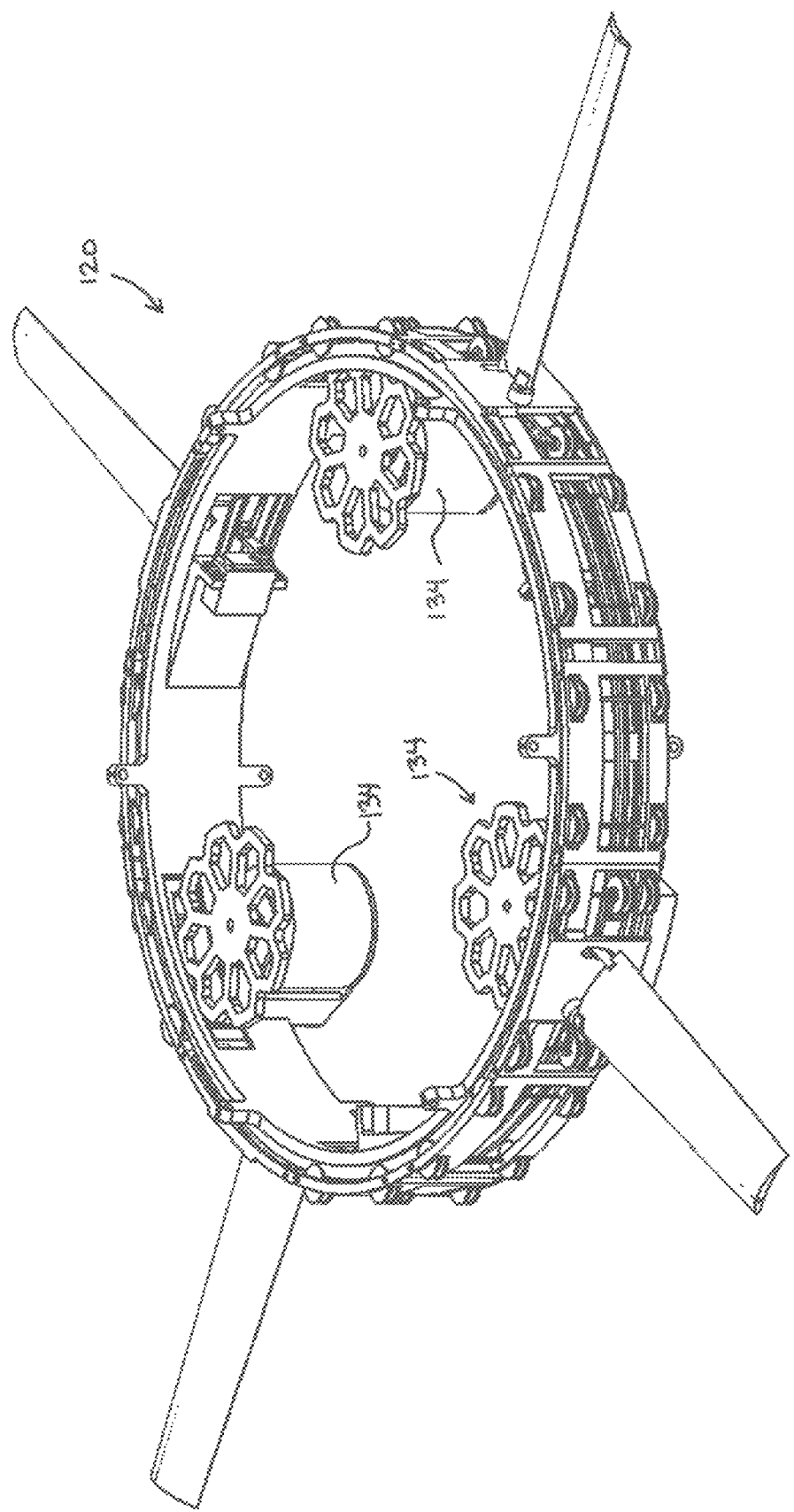
FIG. 1E is a variant of the VSTOL apparatus of FIG. 1D having three independent motor assemblies, with the top and bottom dome apparatus removed from view in accordance with the principles of the present disclosure.
Figure 1F:
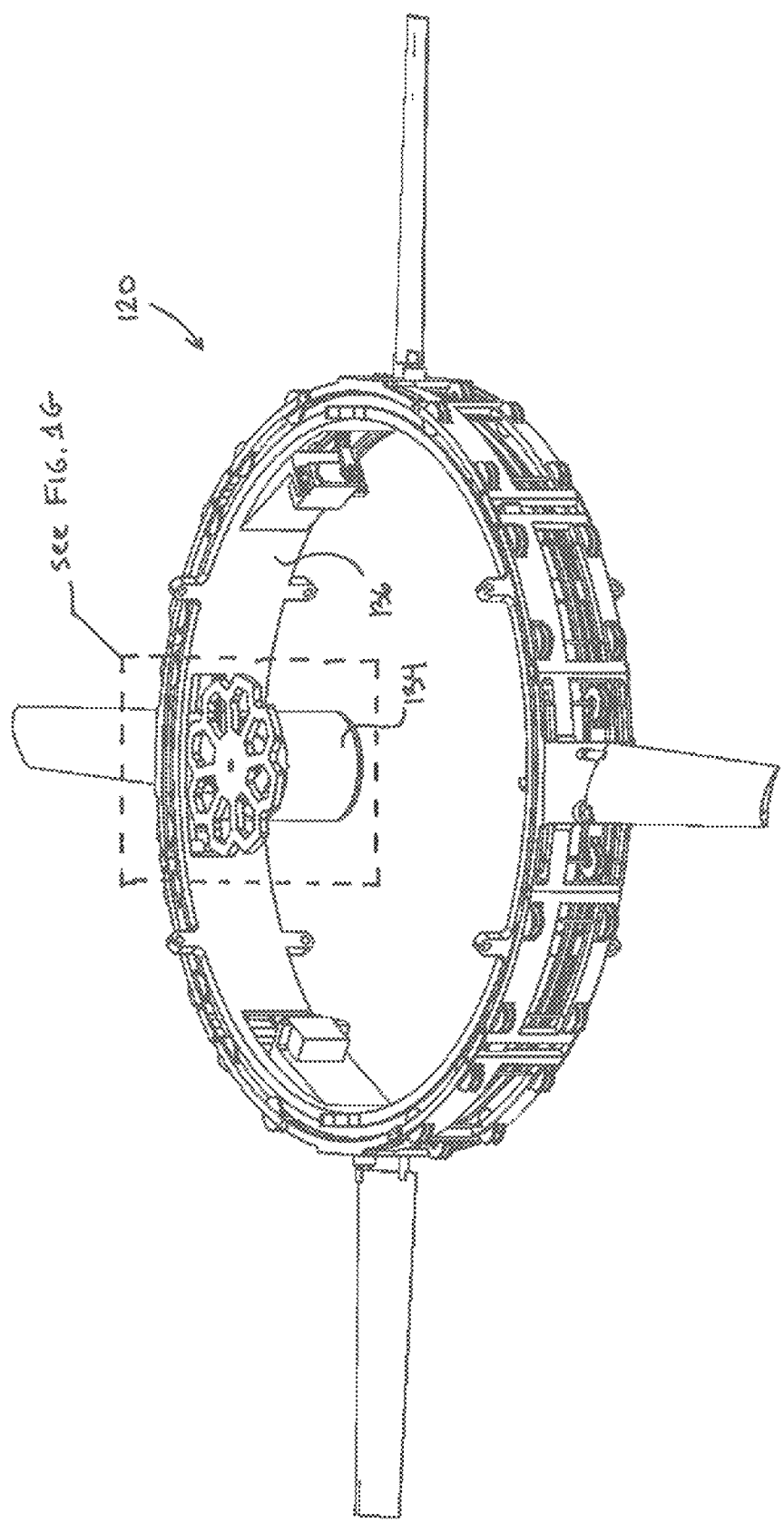
FIG. 1F is a perspective view of the VSTOL apparatus of FIG. 1C, with the top and bottom dome apparatus removed from view in accordance with the principles of the present disclosure.
Figure 1G:
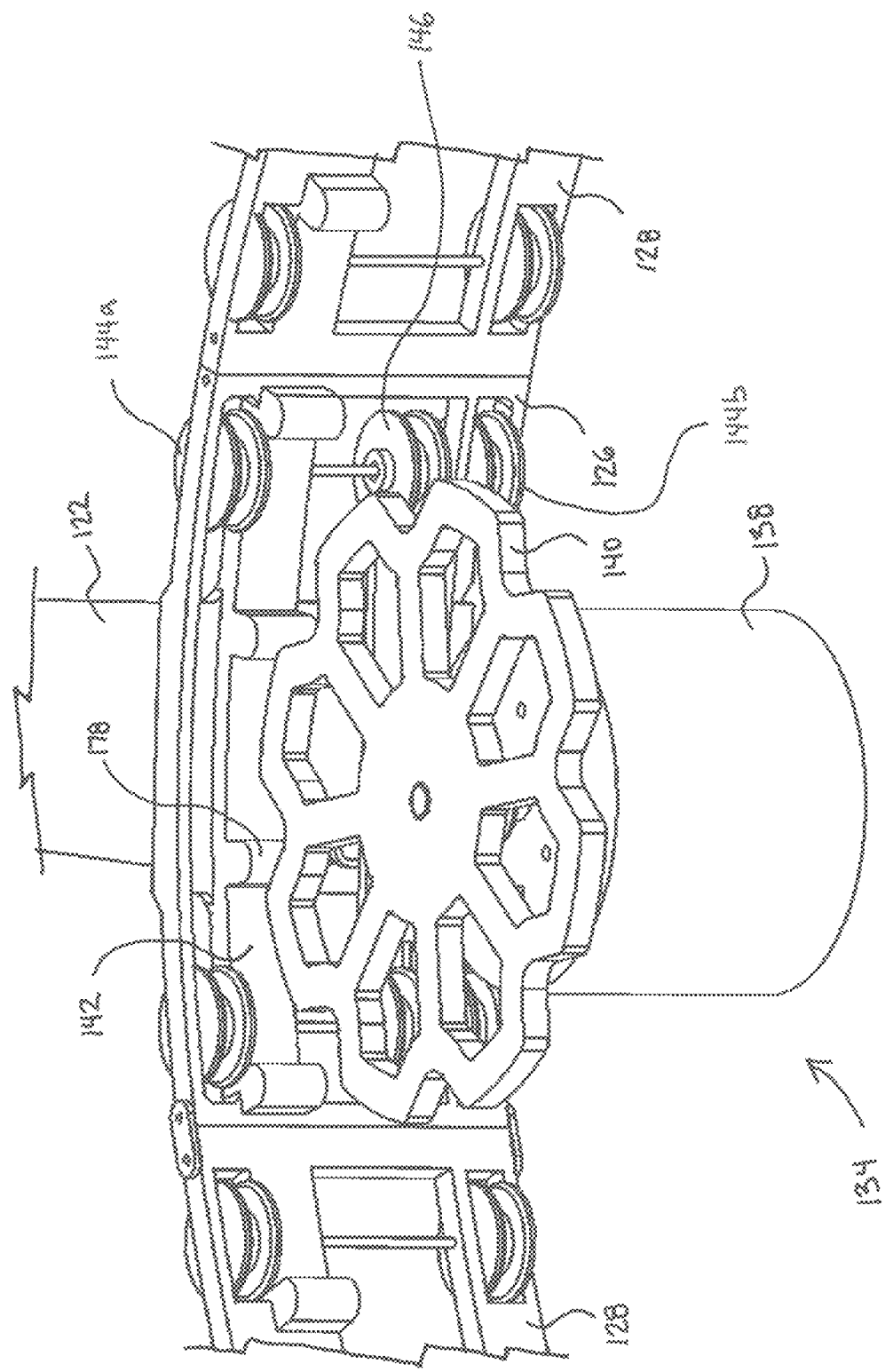
FIG. 1G is a detailed perspective view of the motor assembly for use in, for example, the VSTOL apparatus of FIG. 1A in accordance with the principles of the present disclosure.
Figure 1H:
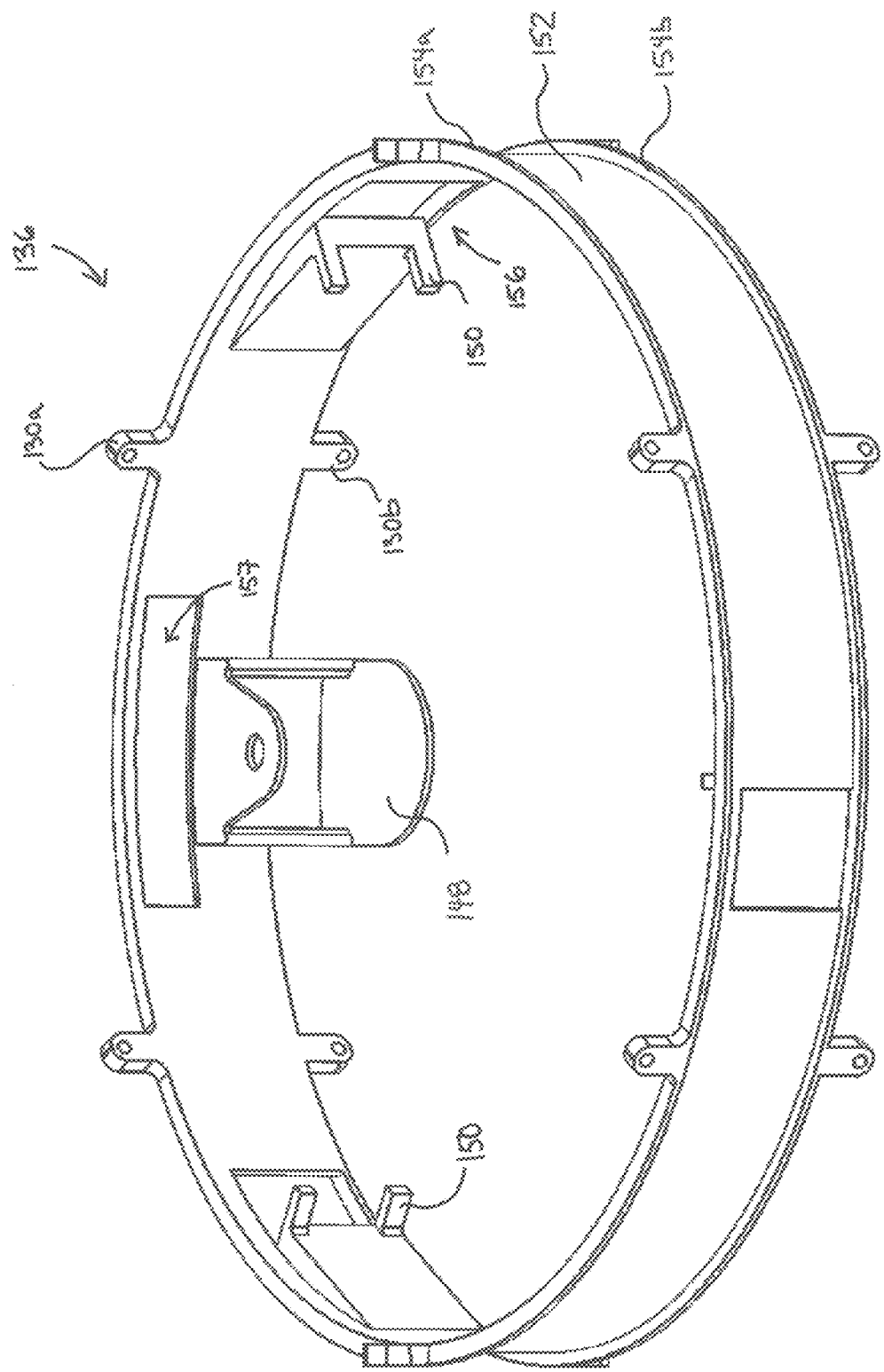
FIG. 1H is a perspective view of an exemplary fuselage for use in, for example, the VSTOL apparatus of FIG. 1A in accordance with the principles of the present disclosure.
Figure 1J:
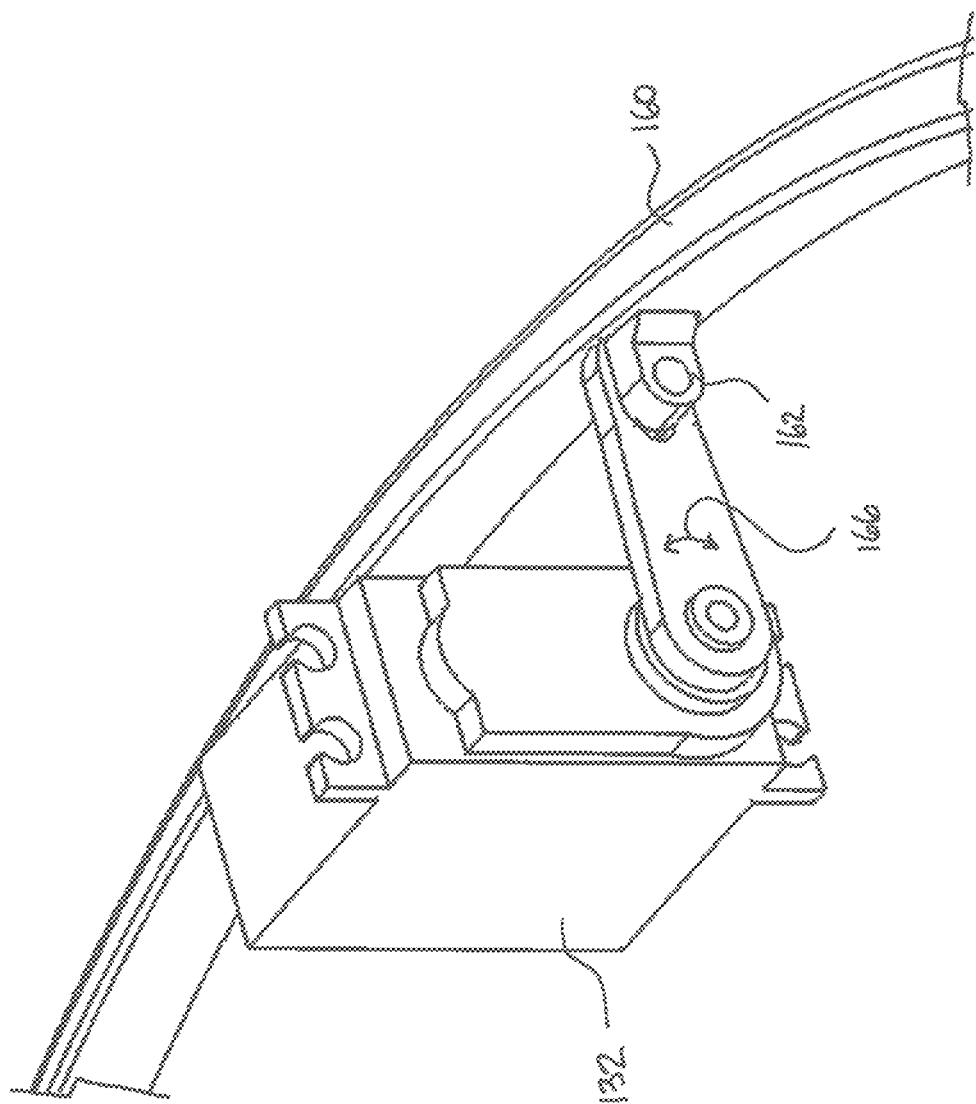
FIG. 1J is a detailed perspective view of the actuator assembly for use in, for example, the VSTOL apparatus of FIG. 1A in accordance with the principles of the present disclosure.
Figure 1K:
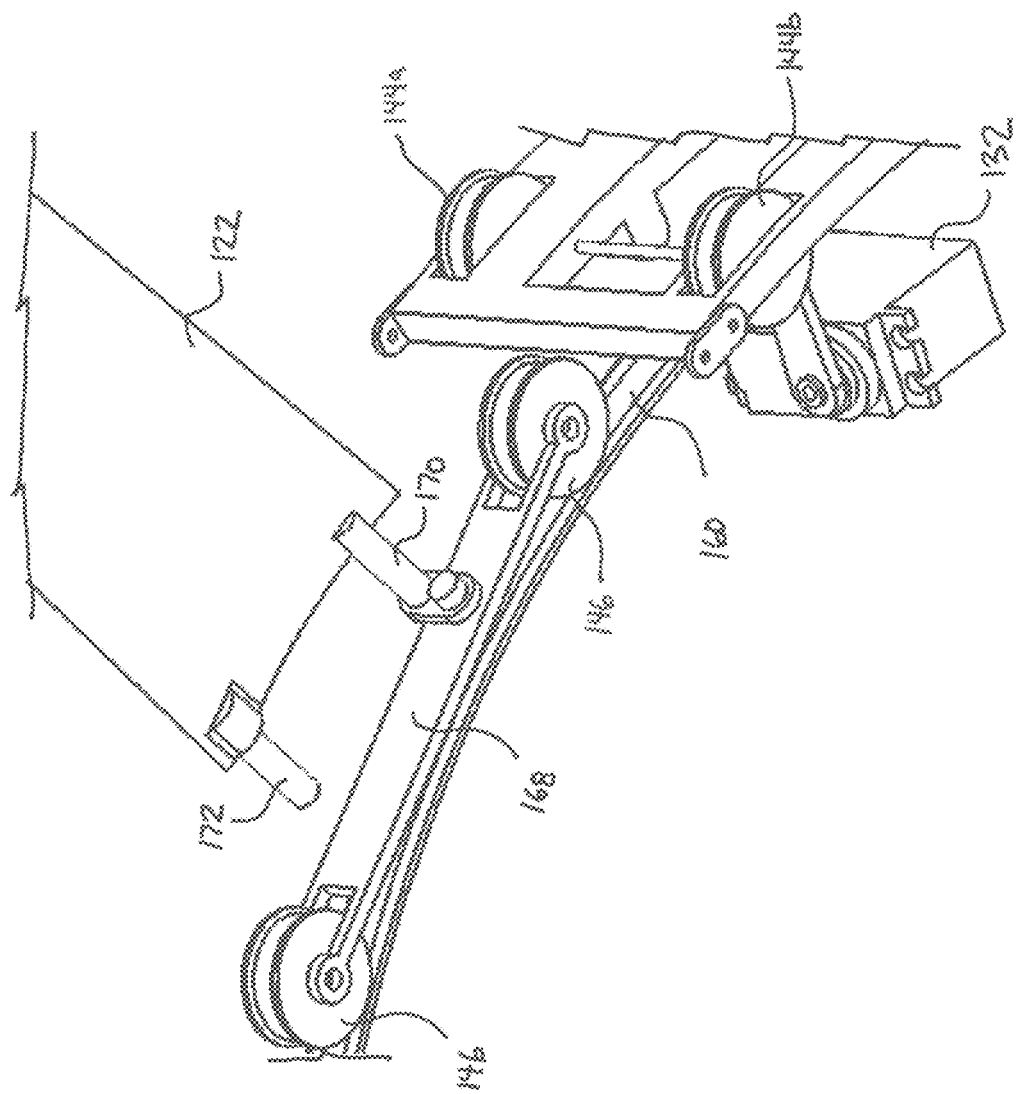
FIG. 1K is a perspective view illustrating the actuator assembly coupled with an actuator cam assembly that is in turn coupled with an airfoil for use in, for example, the VSTOL apparatus of FIG. 1A in accordance with the principles of the present disclosure.
Figure 1M:
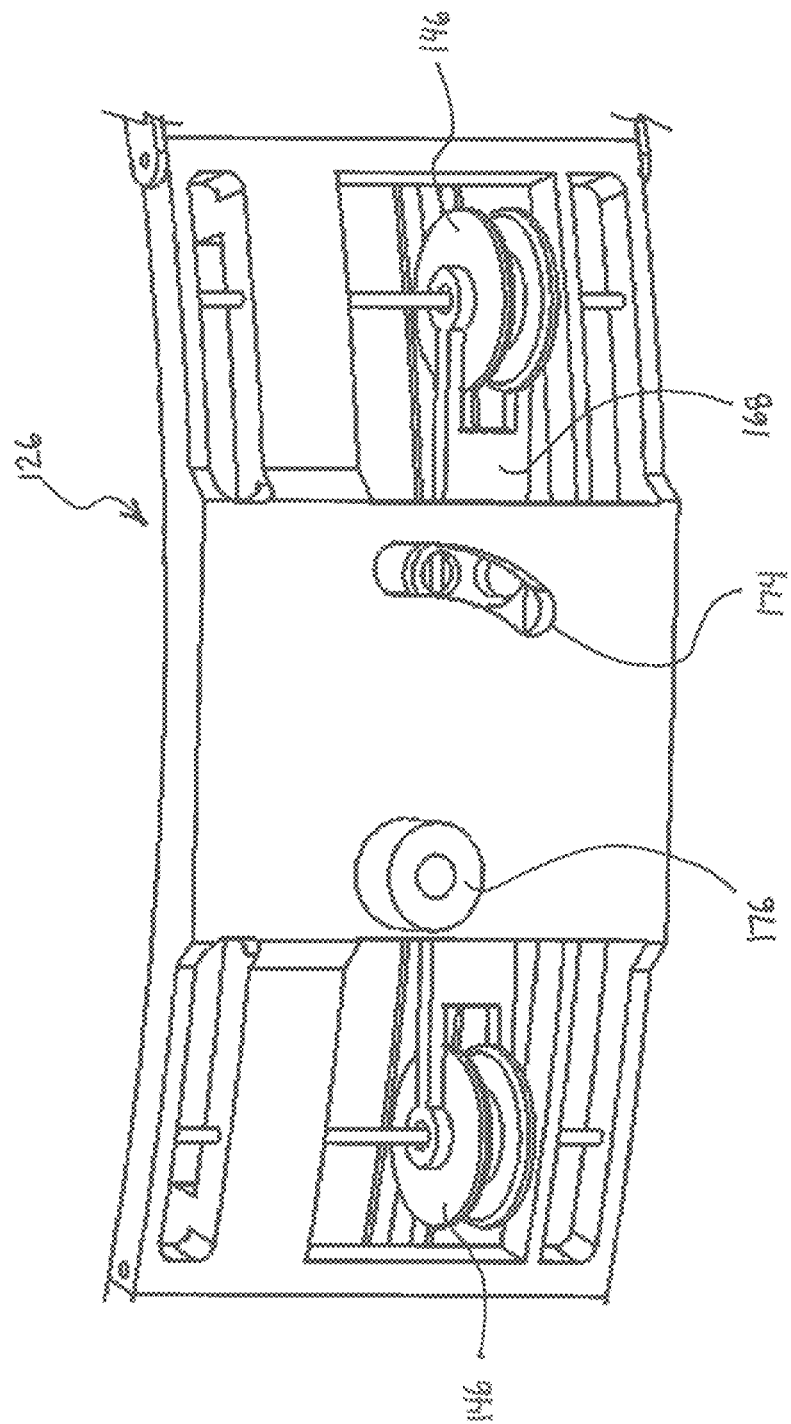
FIG. 1M is a perspective view of an power/articulation mounting body for use in, for example, the VSTOL apparatus of FIG. 1A in accordance with the principles of the present disclosure.
Figure 1N:
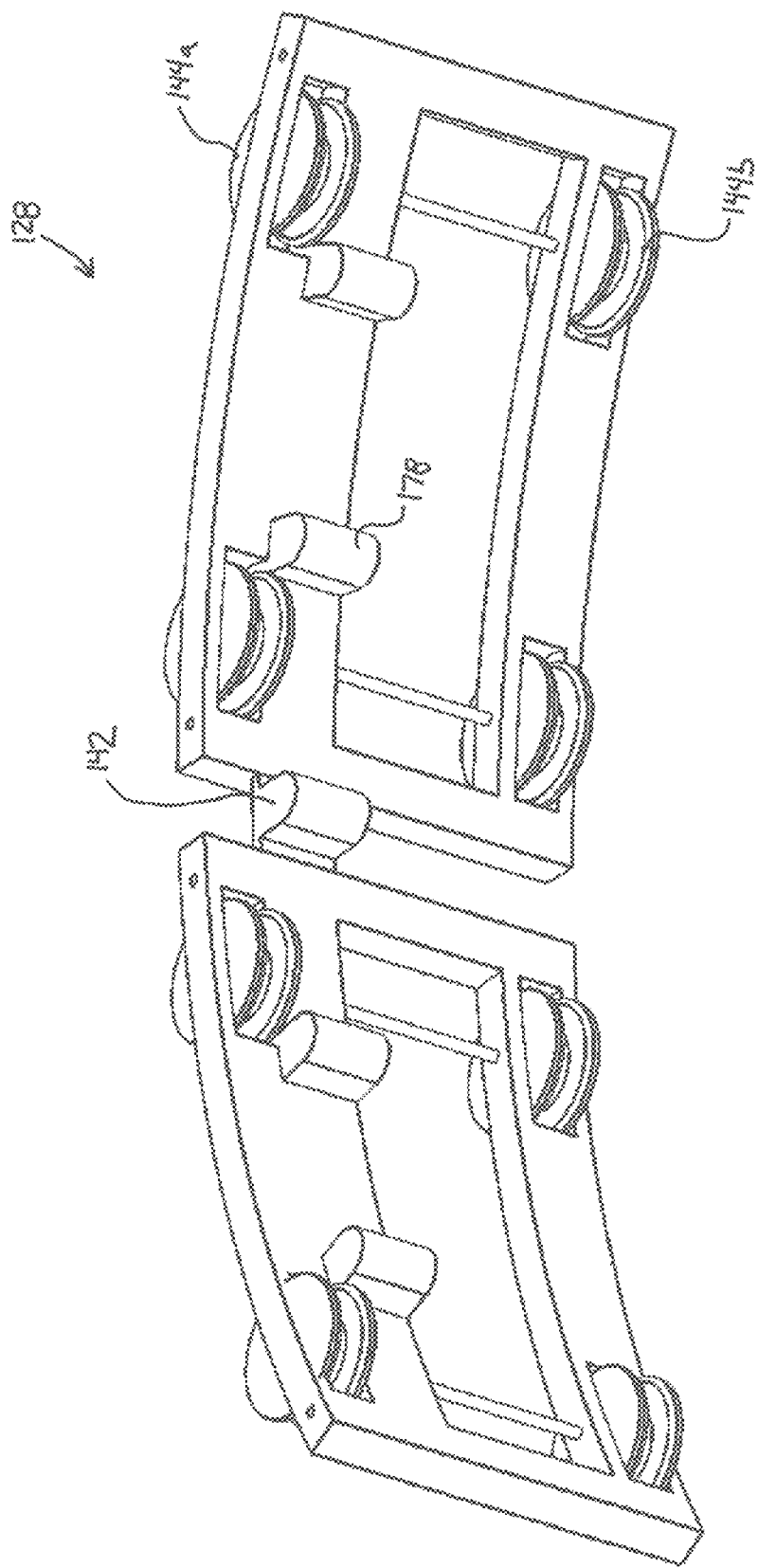
FIG. 1N is a perspective view of a power mounting body for use in, for example, the VSTOL apparatus of FIG. 1A in accordance with the principles of the present disclosure.

Referring now to FIG. 1A, an exemplary VSTOL apparatus 100 is shown and described in detail with respect to the discussion contained within FIGS. 1A-1N. As shown in FIG. 1A, the VSTOL apparatus includes a main body assembly 120 as well as a shroud assembly 102. In some implementations, the main body assembly 120 is coupled with the shroud assembly 102 via use of support rods 108. As shown, the VSTOL apparatus 100 includes twelve (12) support rods 108, with six (6) upper support rods 108a and six (6) lower support rods 108b. However, it would be readily apparent to one of ordinary skill given the contents of the present disclosure that the number of support rods that couple the main body assembly 120 to the shroud assembly 102 may readily vary depending upon the specific requirements of the design. In some implementations, the number of support rods 108 chosen will balance the desire to minimize the weight of the VSTOL apparatus 100, while providing the requisite rigidity between the main body assembly 120 and the shroud assembly 102. As illustrated, the shroud assembly 102 includes two (2) intakes 104 as well as two (2) output ports (denoted by flappers 106). Similar to the discussion with respect to the number of support rods, the number of intakes and/or the number of output ports may be readily varied dependent upon the desired performance characteristics desired for the VSTOL apparatus 100.

Referring now to FIG. 1B, additional detail with regards to the shroud assembly 102 can now be seen with the outer shroud removed from view. Specifically, in the illustrated embodiment, the thruster motors 110 for use in the shroud assembly may be seen. In some implementations, the thruster motors 110 may include so-called electric ducted fan (EDF) motor systems. Referring back to FIG. 1A, the thruster motors may take in air through the intakes 104 and may exhaust air through the output ports. There are a variety of ways by which the shroud assembly may provide operational control for the VSTOL apparatus 100. For example, by opening (and/or closing) the flappers 106, the aerodynamic characteristics of the VSTOL apparatus 100 may change. For example, with both thruster motors 110 running, one may close (or partially close) one of the flappers 106, while leaving the other flapper open. In such a scenario, the VSTOL apparatus 100 may yaw either in a clockwise or counter-clockwise rotation, dependent upon which flapper 106 is open and which flapper 106 is closed. In some implementations, the flappers may not be present, for example, and yaw may be induced by increasing power to one of the thruster motors 110 while maintaining (or lowering) power to the other thruster motor 110. In some implementations, a combination of the foregoing may be used (i.e., a combination of opening/closing the flappers 106 as well as altering power to the thruster motors 110). In the illustrated VSTOL apparatus 100, the main body assembly 120 includes a single set of airfoils that each rotate in the same general manner (e.g., clockwise, counter-clockwise, etc.). Accordingly, a torque effect will be imparted on the VSTOL apparatus 100 by virtue of the rotating airfoils. The thruster motors 110 may be utilized to counteract this torque effect which may, for example, be utilized to prevent the VSTOL apparatus 100 from rotating, or may be utilized to allow the VSTOL apparatus 100 to rotate. For example, if the torque effect of the airfoils causes the VSTOL apparatus 100 to rotate in a clock-wise direction, a decrease in power to one or more of the thruster motors 110 may allow the VSTOL apparatus 100 to rotate in this clock-wise direction; conversely, an increase in power to one or more of the thruster motors 110 may allow the VSTOL apparatus 100 to rotate in a counter clock-wise direction. Additionally, the use of the thruster motors 110 may also allow for translational motion of the VSTOL apparatus 100 (e.g., forward and backward). These and other variants would be readily apparent to one of ordinary skill given the contents of the present disclosure.

Referring now to FIG. 1C, an exemplary embodiment of the main body assembly 120 is shown and described in detail. In some implementations, the main body assembly 120 may operate as a standalone device (i.e., without the use of the shroud assembly 102, FIG. 1A). In other implementations, the main body assembly 120 is intended to be used with the shroud assembly 102, FIG. 1A. As shown in FIG. 1C, the main body assembly 102 includes power/articulation mounting bodies 126 (see also FIG. 1M) as well as power mounting bodies 128 (see also FIG. 1N). The number of power/articulation mounting bodies 126 and power mounting bodies 128 may vary dependent upon, the number of airfoils 122 used in the design (e.g., more airfoils 122 may require more power/articulation mounting bodies 126 to be utilized); or may vary dependent upon the size of the main body assembly 120. As their names suggest, the power mounting bodies 128 are intended to be used to impart power to the main body assembly airfoils 122; while the power/articulation mounting bodies 126 are intended to be used not only for imparting power, but also for the articulation of the airfoils as will be discussed in additional detail subsequently herein. The airfoils 122 are intended to be coupled with the power/articulation mounting bodies 126. In some implementations, the shape of the airfoils may be configured to change during flight by extending outward or retracting inward during or prior to flight (e.g., may include extensible airfoils) and/or by altering the airfoil cross-section (e.g., by increasing/decreasing the leading edge cross-section and/or the trailing edge cross-section). Shape altering airfoils are described in co-owned U.S. patent application Ser. No. 13/675,707 filed Nov. 13, 2012 entitled "Methods and Apparatus for Vertical Short Takeoff and Landing", now U.S. Pat. No. 8,979,016, which claims priority to U.S. Provisional Patent Application Ser. No. 61/560,667 filed Nov. 16, 2011 entitled "Methods and Apparatus for Vertical Short Takeoff and Landing", each of the foregoing previously incorporated herein by reference in its entirety supra. In addition, the fuselage for the main body assembly 120 may be covered with respective domes 124 (e.g., top dome 124a and bottom dome 124b). The use of these respective domes 124 may improve upon the aerodynamic characteristics of the main body assembly 120 (and/or VSTOL apparatus 100, FIG. 1A), although there use may be optional in some implementations.

Referring now to FIG. 1D, the main body assembly 120 of FIG. 1C is illustrated with the top dome 124a and bottom dome 124b removed from view. As illustrated, the main body assembly 120 includes a fuselage 136 that may be configured to support the power motor assembly 134 as well as the actuator motor assembly 132. Additionally, the fuselage may include mounting points 130a, 130b for attachment of support rods 108. Moreover, the additional space within the fuselage may be utilized for housing equipment, personnel, fuel and other types of payloads. In the illustrated embodiment, the number of actuator motor assemblies 132 is three (3), each separated by approximately 120° from one another. In other words, the actuator motor assemblies 132 may be distributed approximately evenly about the circumference of the fuselage 136. In some implementations, the main body assembly 120 may include more (e.g., four (4) or more) or fewer (one (1) or two (2)) actuator motor assemblies 132. Additional discussion with respect to the actuator motor assemblies 132 will be described in additional detail with respect to FIG. 1J discussed infra. In addition, as is illustrated in FIG. 1D, the main body assembly is illustrated as including a single power motor assembly 134, although it will be appreciated that more than one power motor assembly 134 may be included with the main body assembly 120 in some implementations (e.g., FIG. 1E illustrates a variant with three (3) power motor assemblies 134). The use of a single power motor assembly 134 may be desired for the purposes of limiting the amount of weight for the main body assembly 120. The power motor assembly 134 may include electric motors (such as that illustrated in FIG. 1D) or may include a gas turbine motor, an internal combustion engine, or even hybrid systems (e.g., electrical and internal combustion) in some implementations. Additionally, in some implementations, the types of motor assemblies may vary within a single main body assembly 120 (e.g., one power motor assembly may include an electric motor while another power motor assembly may include an internal combustion engine as but one non-limiting example).

Referring now to FIG. 1E, a main body assembly 120 with three (3) power motor assemblies 134 is shown. In some implementations, the three (3) power motor assemblies are intended to be used simultaneously (i.e., each of the power motor assemblies are intended to operate in unison). However, in some implementations it may be desirable to operate less than the full number of power motor assemblies at the same time. Such ability may increase the ability for the main body assembly to utilize less fuel (e.g., battery power, gaseous fuels or liquid fuels (such as gasoline)). In addition, in some implementations, it may be desirable to rotate the power motor assemblies in use. For example, power motor assemblies 134 may not be intended to operate for the full time that fuel is available (e.g., for the purpose of preventing over heating of the power motor assembly 134). Accordingly, one motor may be switched on for a period of time while another motor may be switched off. Additionally, one or more of the power motor assemblies 134 may be utilized for the purpose of providing power redundancy. For example, one of the power motor assemblies 134 may not be scheduled for use; however, upon the detection of a fault with respect to one (or more) of the power motor assemblies, the power motor assembly 134 not scheduled for use may be switched on while the power motor assembly for which the fault was detected may be switched off. The electronics utilized for this determination and selection may be housed within the fuselage, for example. These and other variants would be readily apparent to one of ordinary skill given the contents of the present disclosure.

Referring now to FIGS. 1F and 1G, the operation of the power motor assembly 134 is shown and described in detail. In particular, with respect to FIG. 1G, the power motor assembly 134 may include a power system 138 (e.g., a brushless electric motor as but one example) as well a power transfer portion 140. As illustrated in FIG. 1G, the power transfer portion may include a sprocket assembly 140, although it would be appreciated that other forms of power transfer may be readily used in alternative variants. For example, as illustrated the power transfer portion 140 may include indented portions that are configured to engage teeth 178 located on the power mounting bodies 128 (see also FIG. 1N) and the power/articulation mounting bodies 126 (see also FIG. 1M). The assemblage of these teeth 178 may further be included on a second power transfer portion 142. However, in alternative variants, the teeth may be located on the power transfer portion 140 with the associated indentations located on the power mounting bodies 128 and the power/articulation mounting bodies 126. The power motor assembly 134 may include the ability for the power transfer portion 140 to freely spin in some implementations. For example, in embodiments that include multiple power motor assemblies 134 in which one or more of these power motor assemblies 134 is not powered, the non-powered power motor assembly(ies) 134 may freely spin as the second power transfer portion 142 is powered by other powered motor assembly(ies) 134. In some implementations, it may be desirable to implement an actuation mechanism that disengages the power transfer portion 140 from the second power transfer portion 142 for the non-powered power motor assembly 134 in order to reduce, inter alia, friction or drag created by this non-powered power motor assembly. These and other variants would be readily appreciated by one of ordinary skill given the contents of the present disclosure.

Referring now to FIG. 1H, one exemplary fuselage 136 is shown and described in detail. The fuselage may include a housing 148 for fixedly securing the power motor assembly 134. The fuselage may also include mounting locations 150 for positioning the actuator motor assemblies 132. Additionally, and as was discussed previously herein, the fuselage may include mounting points 130*a*, 130*b* for attachment of support rods 108. The fuselage may further include apertures 156, 157 for enabling the engagement of the power motor assemblies 134 and actuator motor assemblies 132 to the respective power mounting bodies 128 and power/articulation mounting bodies 126. The external surface 152 of the fuselage 136 may further include retaining ledges 154*a*, 154*b*. The retaining ledges 154*a*, 154*b* may be configured to retain the static rail 158, FIG. 1I. In particular the top retaining ledge 154*a* may engage the top portion 164*a* of the static rail 158, while the bottom retaining ledge 154*b* may engage the bottom portion 164*b* of the static rail 158.

Referring now to FIG. 1I, the static rail 158 and the transient rail 160 are illustrated as removed from the main body assembly 120. As the name suggests, the static rail is configured to be fixedly secured to the fuselage 136, while the transient rail 160 is configured to articulate via articulation coupling points 162. The articulation coupling points 162 are configured to attach to respective actuator motor assemblies 132. The transient rail may be configured to articulate up or down in response to being actuated by the respective actuator motor assemblies 132. Additionally, the transient rail 160 may articulate in unison (i.e., such that transient rail 160 may remain disposed in a parallel orientation with respect to, for example, the top portion 164*a* of the static rail, or may articulate independently. For example, in instances in which the transient rail articulates independently, one articulation coupling point 162 may be articulated by a first given measurement, while a second articulation coupling point 162 may be articulated by a second given measurement, the second given measurement differing from the first given measurement. This independent articulation may enable the main body assembly 120 to roll or pitch during flight by, for example, enabling a higher degree of articulation with respect to one airfoil over, for example, other airfoils of the main body assembly 120.

FIG. 1J illustrates the coupling of the actuator motor assembly 132 to the transient rail 160 via articulation coupling point 162. In the illustrated implementation, actuator motor assembly arm is configured to articulate according to the motion vector 166. In some implementations, the actuator motor assembly 132 may include a servo motor although it would be readily apparent to one of ordinary skill given the contents of the present disclosure that the servo motor may be replaced by other actuation mechanisms such as, for example, a worm gear actuation mechanism, a rack and pinion assembly and the like. These and other variants would be readily apparent to one of ordinary skill given the contents of the present disclosure.

Referring now to FIGS. 1K and 1L, the means by which the airfoils may be articulated may more readily be apparent. Specifically, a cam arm 168 is illustrated that is coupled to two wheels 146. In some implementations, the cam arm 168 may include a single wheel (i.e., one of the two wheels 146 may be obviated). Such an implementation may, inter alia, reduce the number of overall wheels used on the assembly, thereby reducing friction and improving upon the power transfer between the power motor assembly 134 and the power/articulation mounting body 126. The cam arm 168 is coupled to a connection rod 170 located on the airfoil 122. In some implementations, the connection rod 170 is located on the trailing edge portion of the airfoil. In other implementations, the connection rod may be located on the leading edge portion of the airfoil. The wheels 146 are configured to roll along the transient rail 160. Specifically, in some implementations, the transient rail 160 is configured to be positioned within a center portion of the wheels 146 with corresponding portions of the wheel 146 being positioned both above and below the transient rail 160. Such a configuration provides support for the wheels whether the transient rail 160 is articulated upward or downward. Additionally, such a configuration may minimize friction between the wheels 146 and the transient rail so as to, inter alia, maximize the efficiency of power applied by the power transfer portion 140 of the power motor assembly 134 to the second power transfer portion 142 resulting in improved fuel consumption efficiency (e.g., improved conservation of battery power, improved conservation of liquid fuels, etc.). As the actuator motor assembly 132 actuates up (or down); the transient rail 160 is also configured to actuate up (or down), accordingly. As the transient rail 160 actuates the wheels 146 are similarly actuated up (or down). As the cam arm 168 is coupled to the trailing edge connection rod 170, actuation of the transient rail 160 causes actuation of the airfoil 122 via connection rod 170. Similarly, wheels 144a, 144b are configured to run along the upper 164a and lower 164b ledges of the static rail 158. However, unlike wheels 146, wheels 144a and 144b are not configured to articulate. In some implementations, portions of wheel 144a are configured to be positioned both above and below the top portion 164a of the static rail 158. Similarly, portions of wheel 144b are configured to be positioned both above and below the bottom portion 164b of the static rail 158. As previously discussed, such a configuration may minimize friction resulting in, inter alia, improved fuel consumption efficiency for the main body assembly 120 as well as provide stability (i.e., minimize the chance for wheel 144a to de-rail from upper ledge 164, for example).

Referring now to FIG. 1M, a power/articulation mounting body 126 is shown and described in detail. Specifically, in the illustrated embodiment, power/articulation mounting body 126 may include a fixed coupling point 176 for the connection rod 172 located on the airfoil 122. Additionally, power/articulation mounting body 126 may also include a clearance slot 174 which is configured to allow for the articulation of the airfoil. In the illustrated implementation, the power/articulation mounting body 126 only includes wheels 146 (i.e., doesn't contain upper wheel 144a and lower wheel 144b); however, in some implementations it may be desirable to include upper wheel 144a and lower wheel 144b on the power/articulation mounting body 126.

Referring now to FIG. 1N, the power mounting body 128 is illustrated which includes the aforementioned upper wheel 144a and 144b. Both the power/articulation mounting body 126 and the power mounting body 128 may either comprise a substantially rigid body that conforms to a predefined shape (e.g., curved as illustrated). In alternative implementations, the body for the power/articulation mounting body 126 and/or the power mounting body 128 may include a semi-rigid or flexible body that enables these bodies to conform to a variety of shapes and sizes (see, for example, FIG. 3). These and other variants would be readily apparent to one of ordinary skill given the contents of the present disclosure.

Exemplary VSTOL Apparatus Variants—

Figure 2A:
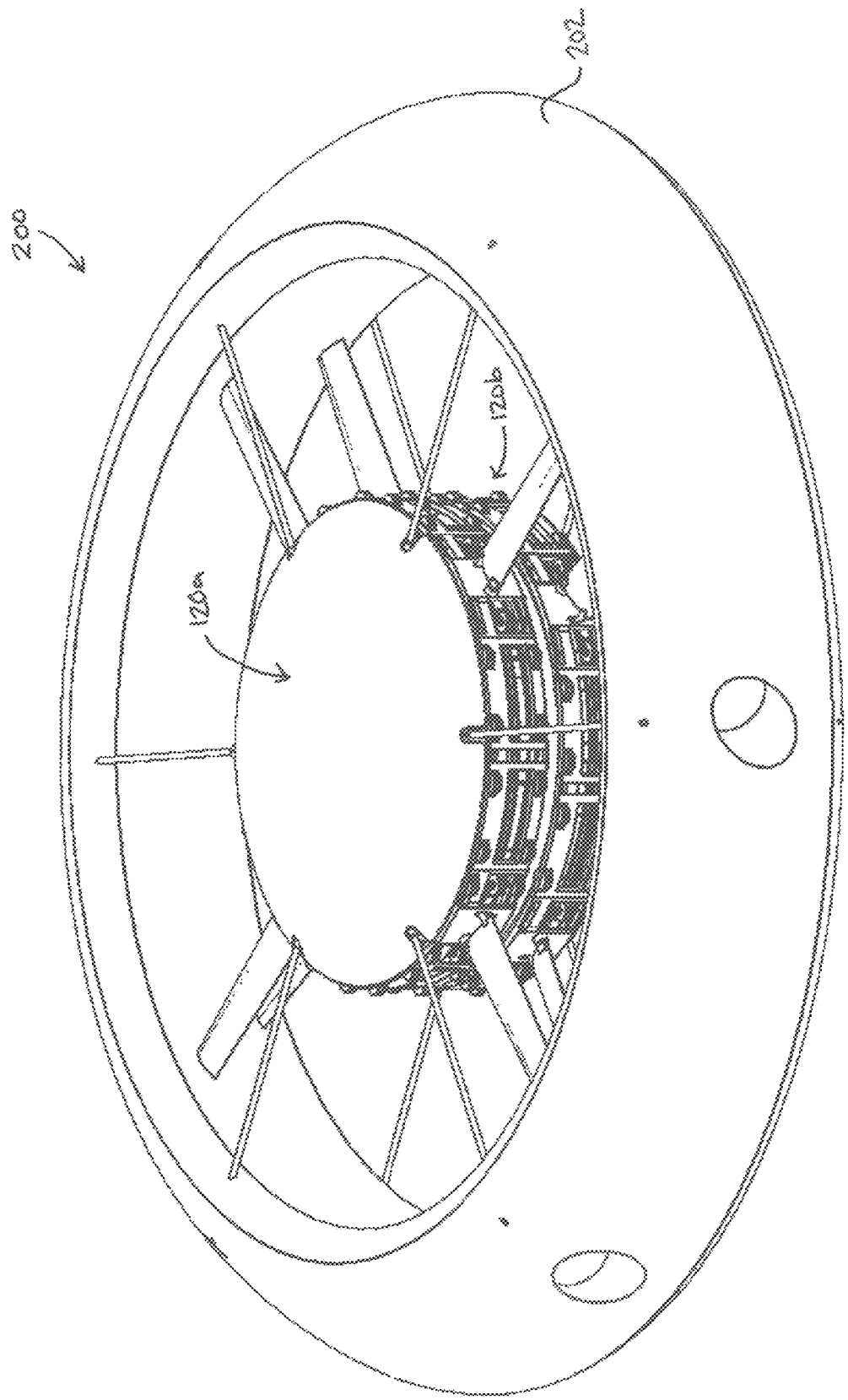
FIG. 2A is a perspective view of a second exemplary embodiment of a VSTOL apparatus in accordance with the principles of the present disclosure.

Referring now to FIG. 2A, an alternative variant of a VSTOL apparatus 200 is shown and described in detail. The VSTOL apparatus includes two main body assemblies 120a and 120b that are coupled to one another. Each of the main body assemblies 120a and 120b are substantially similar to the main body assembly 120 of FIGS. 1A-1N. However, the airfoils of the top main body assembly 120a are configured to contra-rotate with respect to the airfoils of the bottom main body assembly 120b. For example, the top main body assembly 120a may rotate in a clockwise rotation, while the bottom main body assembly 120b may rotate in a counter-clockwise rotation (or vice versa). The benefits of contra-rotation are described in co-owned U.S. patent application Ser. No. 13/675,707 filed Nov. 13, 2012 entitled "Methods and Apparatus for Vertical Short Takeoff and Landing", now U.S. Pat. No. 8,979,016, which claims priority to U.S. Provisional Patent Application Ser. No. 61/560,667 filed Nov. 16, 2011 entitled "Methods and Apparatus for Vertical Short Takeoff and Landing", each of the foregoing previously incorporated herein by reference in its entirety. The illustrated VSTOL apparatus 200 may include a single shroud assembly 202, which operates similarly with regards to shroud assembly 102 described with reference to, for example, FIGS. 1A and 1B.

Figure 2B:
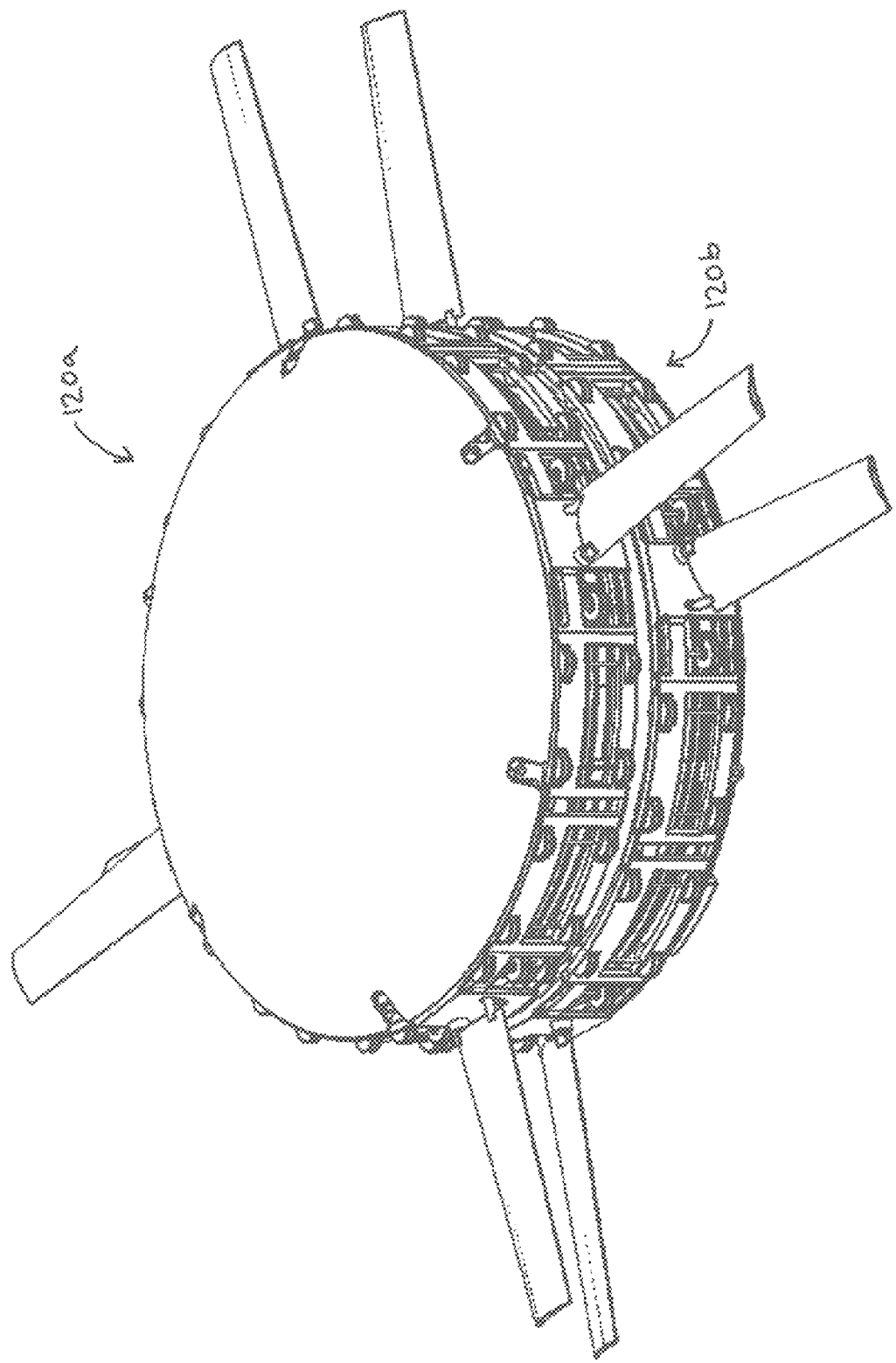
FIG. 2B is a perspective view of the VSTOL apparatus of FIG. 2A, with the shroud removed from view in accordance with the principles of the present disclosure.

Referring now to FIG. 2B, an alternative variant to the VSTOL apparatus 200 is shown. In particular, the apparatus is similar to that shown with reference to FIG. 2A; however, the shroud assembly 102 has been obviated. In addition, to the two main body assemblies 120a and 120b illustrated in FIGS. 2A and 2B, it would be readily apparent to one of ordinary skill given the contents of the present disclosure that three (3) or more body assemblies could be utilized in alternative variants.

Figure 3:
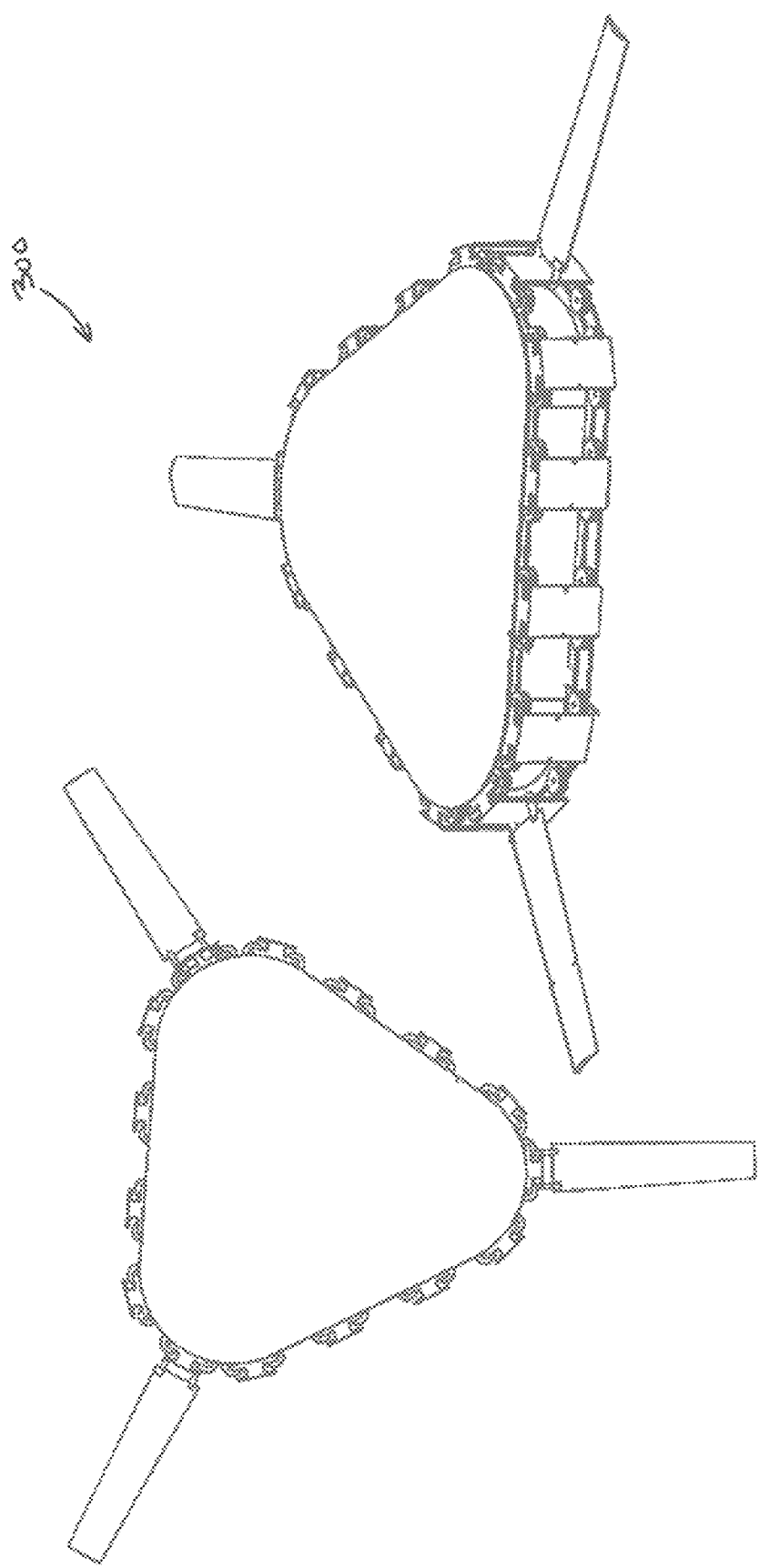
FIG. 3 is a perspective view of a third exemplary embodiment of a VSTOL apparatus in accordance with the principles of the present disclosure.

Referring now to FIG. 3, yet another variant of a VSTOL apparatus 300 is shown and described in detail. In particular, the VSTOL apparatus 300 operates according to the principles of the main body assembly 120 discussed with reference to FIGS. 1A-1N; however, unlike that particular embodiment, the VSTOL apparatus 300 includes a generally triangular housing profile. Such an embodiment is provided to illustrate the provided flexibility with regards to the main body assembly design illustrated with regards to FIGS. 1A-1N. Additionally, the VSTOL apparatus 300 may include two or more main body assemblies that may contra-rotate in alternative variants (not shown) as well as may include a shroud assembly (not shown) in alternative variants.

Figure 4:
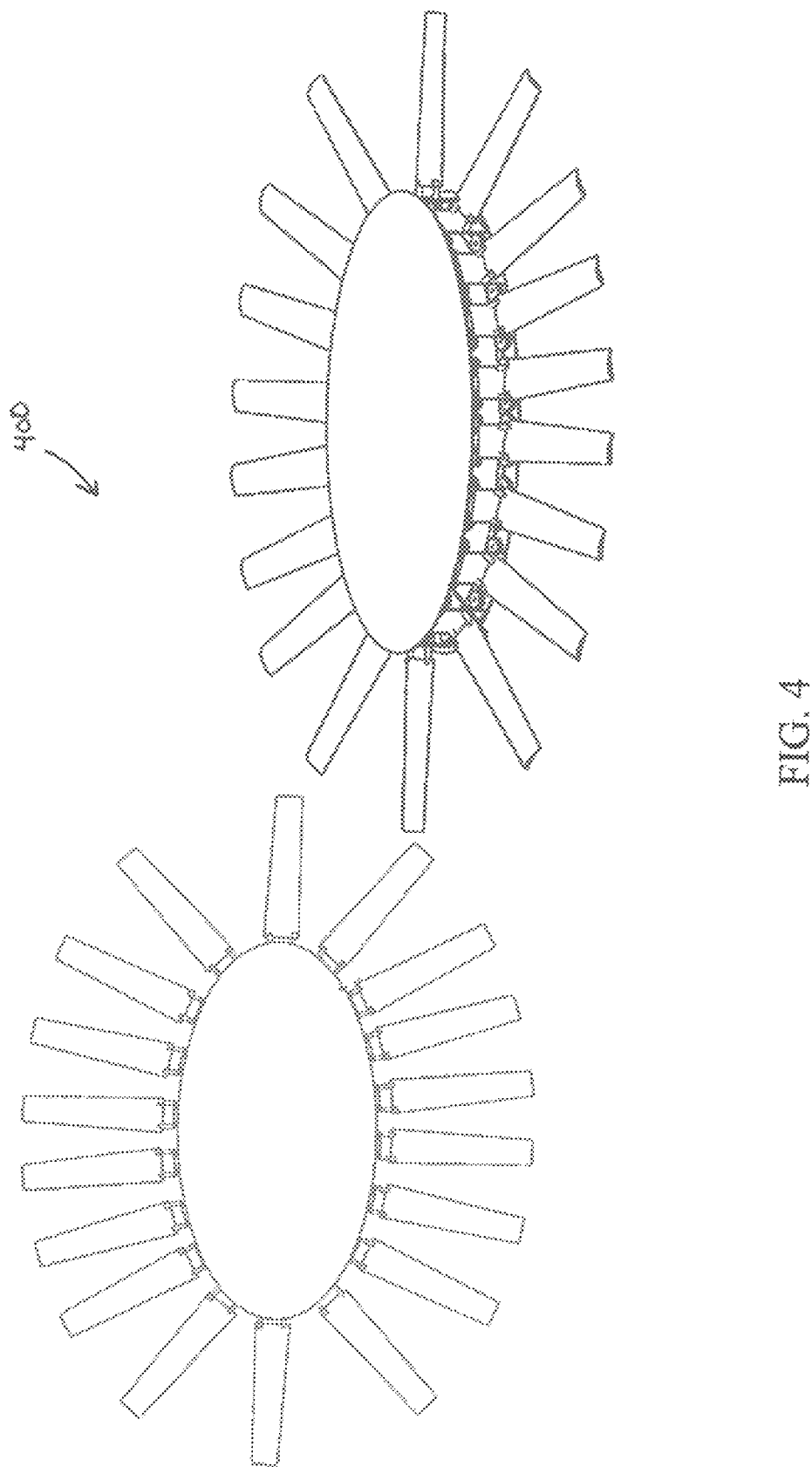
FIG. 4 is a perspective view of a fourth exemplary embodiment of a VSTOL apparatus in accordance with the principles of the present disclosure.

Referring now to FIG. 4, yet another variant of a VSTOL apparatus 400 is shown and described in detail. In particular, the VSTOL apparatus 400 operates according to the principles of the main body assembly 120 discussed with reference to FIGS. 1A-1N; however, unlike that particular embodiment, the VSTOL apparatus 400 includes an oval housing profile. Such an embodiment is provided again to illustrate the provided flexibility with regards to the main body assembly design illustrated with regards to FIGS. 1A-1N. Additionally, the VSTOL apparatus 400 may include two or more main body assemblies that may contra-rotate in alternative variants (not shown) as well as may include a shroud assembly (not shown) in alternative variants.

Figure 5:
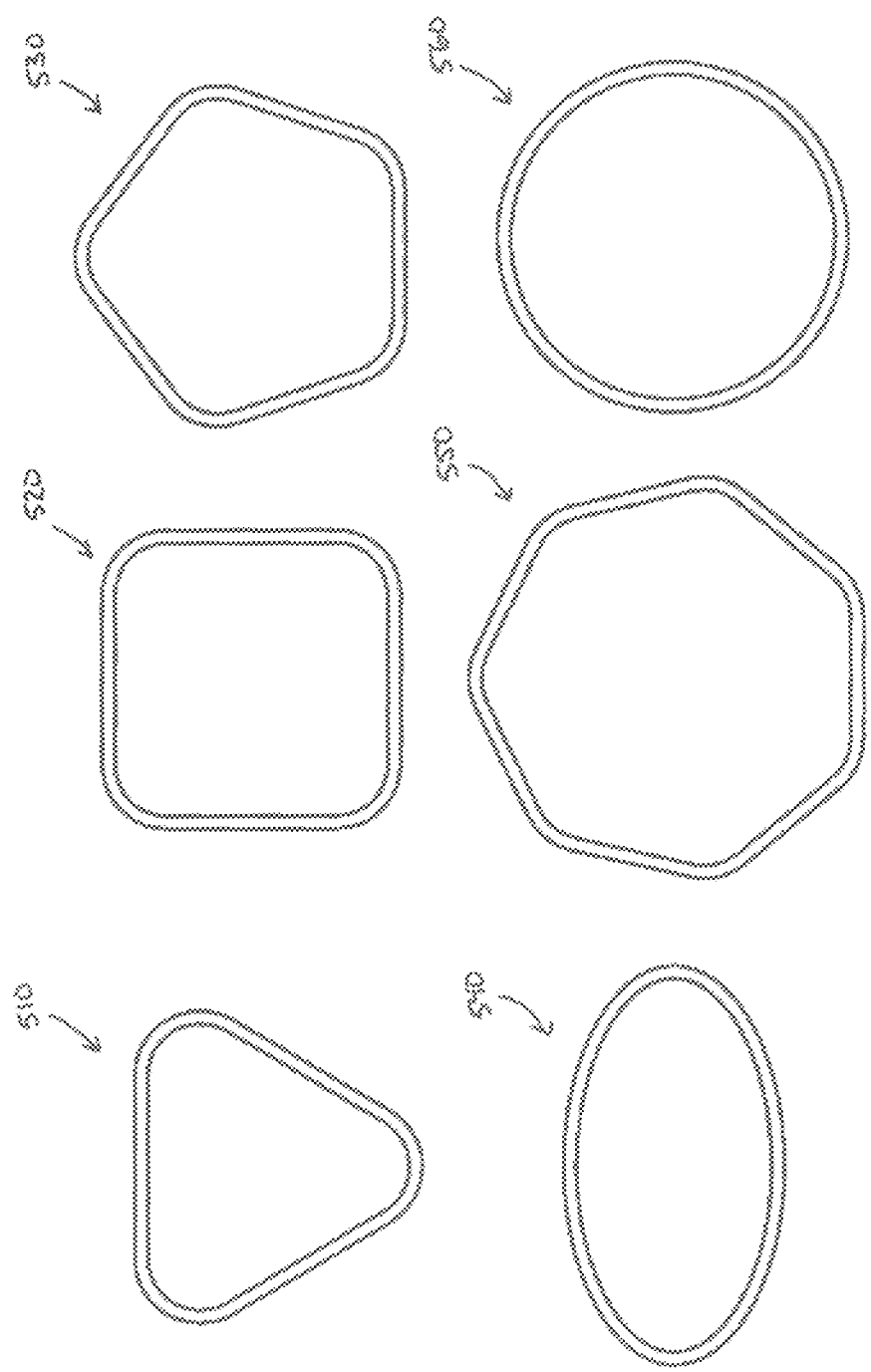
FIG. 5 are top down views of various main body assembly configurations in accordance with the principles of the present disclosure.

Referring now to FIG. 5, various housing profiles for VSTOL apparatus variants are shown. In particular, the housing profiles include a triangular housing profile 510 (similar to FIG. 3), a square housing profile 520, a pentagon housing profile 530, an oval housing profile 540 (similar to FIG. 4), a heptagon housing profile 550 and a circular housing profile 560 (similar to that shown with regards to FIGS. 1A-1N). These and other variants would be readily apparent to one of ordinary skill given the contents of the present disclosure.

Figure 6:
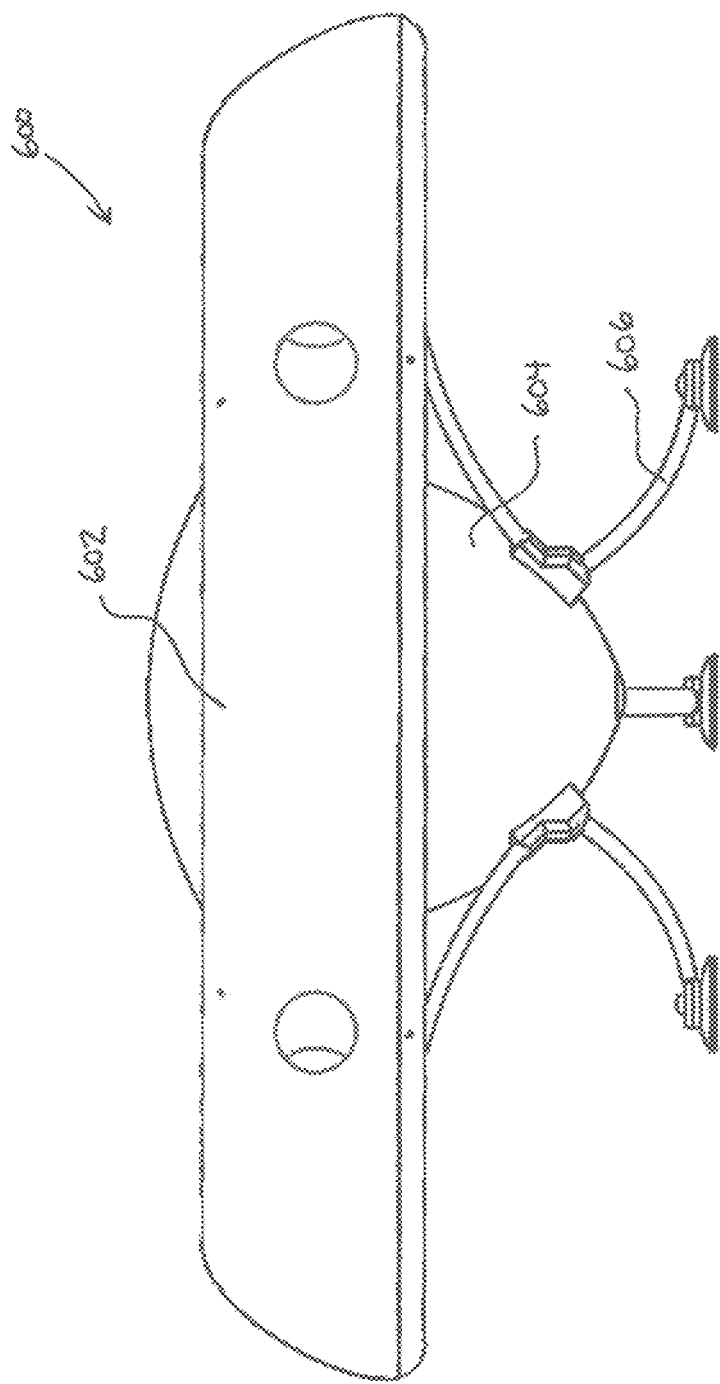
FIG. 6 is a front plan view of a fifth exemplary embodiment of a VSTOL apparatus in accordance with the principles of the present disclosure.

Referring now to FIG. 6, yet another alternative variant for a VSTOL apparatus 600 variant is shown. In particular, the VSTOL apparatus 600 includes a landing gear 606 mounted to the VSTOL apparatus. The landing gear 606 may be coupled to the shroud assembly 602 as well as the lower dome 604 as illustrated. However, it is appreciated that other variants may be easily derived given the contents of the present disclosure including variants which enable the landing gear to telescope, articulate or remain fixed. Additionally, in variants that do not include a shroud assembly (e.g., FIG. 2B), the landing gear may be coupled to, for example, the fuselage of the main body assembly. Variants of the landing gear as described herein may be included on any of the variants described with reference to FIGS. 1A-5.

It will be recognized that while certain aspects of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated of carrying out the principles and architectures described herein. This description is in no way meant to be limiting, but rather should be taken as illustrative of the general principles of the disclosure. The scope of the invention should be determined with reference to the claims.

What is claimed is:

1. A vertical short takeoff and landing (VSTOL) apparatus, the VSTOL apparatus comprising:
   a fuselage;
   a plurality of radially disposed airfoils;
   a rail structure configured to remain substantially static in a first plane, the rail structure comprising two peripheral surfaces each formed into a substantially circular shape; and
   a mounting structure disposed concentric with the rail structure, the mounting structure having a ring-like shape and configured to engage the at least one peripheral surface of the rail structure via a first plurality of roller apparatus mounted on said mounting structure so as to allow rotation of the mounting structure relative to the rail structure within the first plane;
   wherein:
      the mounting structure further comprises the plurality of radially disposed airfoils whose at least pitch is controllable while the mounting structure rotates relative to the rail structure during flight of the VSTOL apparatus;
      the mounting structure comprises a second plurality of roller apparatus; and
      the mounting structure is configured to engage (i) a first of the two peripheral surfaces of the rail structure via the first plurality of roller apparatus, and (ii) a second of the two peripheral surfaces via the second plurality of roller apparatus.

2. The VSTOL apparatus of claim 1, wherein the mounting structure is captured relative to the rail structure within both a first dimension and a second dimension, the first dimension comprising a dimension normal to the first plane, and the second dimension comprising a dimension within the first plane.

3. The VSTOL apparatus of claim 2, wherein the mounting structure comprises a second plurality of roller apparatus, the second plurality of roller apparatus configured to engage a movable ring structure of the rail structure, the moveable ring structure configured to translate in a direction substantially parallel to an axis of rotation of the mounting structure, the second plurality of roller apparatus further configured to translate at least partly coincident with the translation of movable ring so as to cause a change in said pitch of at least a portion of said plurality of airfoils.

4. The VSTOL apparatus of claim 1, wherein the first plurality of roller apparatus each comprise rollers comprises a groove formed therein, the groove configured to provide said engagement of the at least one peripheral surface of the rail structure so as to retain said mounting structure and said ring structure in relative alignment in a dimension normal to a plane of said rotation.

5. A vertical short takeoff and landing (VSTOL) system, the VSTOL system comprising:
   a fuselage;
   a plurality of airfoils;
   a first apparatus comprising two peripheral surfaces each formed into a substantially circular shape, a first one of the two peripheral surfaces comprising an outer surface, the outer surface forming the substantially circular shape; and
   a second apparatus concentric with the first apparatus and comprising:
      a ring structure configured to be operatively coupled to at least one motive power source;
      a plurality of airfoil apparatus disposed on an outer periphery of the ring structure and operative to generate lift for the VSTOL apparatus when the plurality of airfoils are moved through air;
      a first plurality of passive roller apparatus; and
      a second plurality of passive roller apparatus;
   wherein the first plurality of passive roller apparatus are configured to engage the outer surface of the first one of the two peripheral surfaces of the first apparatus so as to allow rotation of the second apparatus relative to the first apparatus, and the second plurality of passive roller apparatus are configured to engage a surface of a second one of the two peripheral surfaces of the first apparatus; and wherein the first and second plurality of passive roller apparatus provide no motive force.

6. The VSTOL system of claim 5, wherein the outer surface is disposed on an outer surface of the first apparatus, and the outer surface and the first plurality of roller apparatus cooperate to retain the first apparatus and the second apparatus in relative alignment.

7. The VSTOL system of claim 5, wherein the outer surface is supported by at least an internal support apparatus of the first apparatus such that the outer surface does not distort unacceptably under inward normal forces exerted by one or more of the first plurality of roller apparatus during flight of the VSTOL apparatus.

8. The VSTOL system of claim 5, further comprising at least one control apparatus; and
   wherein each of the plurality of airfoils are configured to articulate between two or more positions based at least in part on actuation by the at least one control apparatus.

9. The VSTOL system of claim 5, wherein each of the plurality of airfoils is further configured to be articulated independently of others of the plurality of airfoil apparatus.

10. A vertical short takeoff and landing (VSTOL) apparatus, comprising:
   a fuselage;
   a first structure configured to remain substantially static in a first plane, the first structure comprising a plurality of peripheral surfaces each formed into a substantially circular shape; and
   a second structure disposed concentric with the first structure, the second structure having at least:
   a plurality of radially disposed airfoils whose at least pitch is controllable while the second structure rotates relative to the first structure during flight of the VSTOL apparatus; and
   a ring-like shape and configured to engage a first of the plurality of peripheral surfaces of the first structure via a first plurality of roller apparatus so as to allow rotation of the second structure relative to the first structure within the first plane, the first plurality of roller apparatus each comprising rollers having a groove formed therein, the groove configured to provide said engagement of the first of the plurality of peripheral surfaces of the first structure so as to retain said second apparatus and said first apparatus in relative alignment in a dimension normal to a plane of said rotation;
wherein:
   the second structure is captured relative to the first structure within both a first dimension and a second dimension, the first dimension comprising a dimension normal to the first plane, and the second dimension comprising a dimension within the first plane;
   the second structure and the plurality of radially disposed airfoils are driven for said rotation by at least one motive source, the motive source mounted to the first structure and having an output coupled only to the second structure; and
   the second structure is further configured to engage a second of the plurality of peripheral surfaces of the first structure via a second plurality of roller apparatus.

* * * * *